(12) United States Patent
Kakii et al.

(10) Patent No.: US 7,983,497 B2
(45) Date of Patent: Jul. 19, 2011

(54) CODING METHOD FOR MOTION-IMAGE DATA, DECODING METHOD, TERMINAL EQUIPMENT EXECUTING THESE, AND TWO-WAY INTERACTIVE SYSTEM

(75) Inventors: Toshiaki Kakii, Tokyo (JP); Hisao Maki, Yokohama (JP); Yoichi Hata, Yokohama (JP); Hitoshi Kiya, Hachioji (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 12/686,993

(22) Filed: Jan. 13, 2010

(65) Prior Publication Data
US 2010/0118935 A1 May 13, 2010

Related U.S. Application Data

(62) Division of application No. 11/063,734, filed on Feb. 24, 2005, now abandoned.

(30) Foreign Application Priority Data

Apr. 23, 2004 (JP) .................................. 2004-128890
Aug. 30, 2004 (JP) .................................. 2004-250854

(51) Int. Cl.
*G06K 9/36* (2006.01)
*G06K 9/46* (2006.01)
(52) U.S. Cl. ........ 382/232; 382/233; 382/236; 382/240; 382/250; 382/251; 375/240.01; 375/240.24
(58) Field of Classification Search .................. 382/133, 382/232, 233, 239, 236, 100, 240, 250, 251, 382/305; 375/240, 240.08, 240.03, 240.01, 375/240.24; 700/86, 19, 83; 705/14; 348/14.12
See application file for complete search history.

(56) References Cited

U.S. PATENT DOCUMENTS
5,815,601 A 9/1998 Katata et al.
(Continued)

FOREIGN PATENT DOCUMENTS
CN 1333973 A 1/2002
(Continued)

OTHER PUBLICATIONS

Sato et al.; "Study of Pick-Up Tube Position in Videophone"; *1967 Joint Meeting of Four Electric Institutes*; No. 1998.

(Continued)

*Primary Examiner* — Samir A Ahmed
*Assistant Examiner* — Ali Bayat
(74) *Attorney, Agent, or Firm* — McDermott Will & Emery LLP

(57) ABSTRACT

This invention relates to a coding method for motion-image data and others effective in a special interactive environment for transmitting motion-image data with information concentrated on only a partial region of a display image as in a two-way interactive system implementing real-time two-way interaction. The coding method involves dividing an image frame forming motion-image data into a plurality of rectangular regions, and grouping each of these rectangular regions into a preset ROI and a non-ROI. These rectangular regions are sequentially compressed so that a code length of a rectangular region grouped into the ROI is larger than a code length of a rectangular region grouped into the non-ROI, thereby generating coded data of each image frame.

11 Claims, 23 Drawing Sheets

U.S. PATENT DOCUMENTS

| | | | |
|---|---|---|---|
| 6,005,604 | A | 12/1999 | Kakii |
| 6,104,417 | A * | 8/2000 | Nielsen et al. ............... 345/542 |
| 6,137,526 | A | 10/2000 | Kakii |
| 6,614,847 | B1 | 9/2003 | Das et al. |
| 6,931,534 | B1 | 8/2005 | Jandel et al. |
| 7,116,843 | B1 * | 10/2006 | Wensley et al. ............. 382/305 |
| 7,224,845 | B1 * | 5/2007 | Russo et al. ................ 382/240 |
| 2001/0019331 | A1 * | 9/2001 | Nielsen et al. ............... 345/542 |
| 2002/0151992 | A1 | 10/2002 | Hoffberg et al. |
| 2003/0202581 | A1 | 10/2003 | Kodama |
| 2003/0227972 | A1 | 12/2003 | Fukuda |
| 2004/0095477 | A1 | 5/2004 | Maki et al. |
| 2006/0182354 | A1 | 8/2006 | Iwamura |

FOREIGN PATENT DOCUMENTS

| | | | |
|---|---|---|---|
| EP | 1 349 393 A1 | 10/2003 | |
| JP | 05-304662 | 11/1993 | |
| JP | 06-253158 | 9/1994 | |
| JP | 06-319134 | 11/1994 | |
| JP | 07-203434 | 8/1995 | |
| JP | 07-288806 | 10/1995 | |
| JP | 11-122610 | 4/1999 | |
| JP | 11-266454 | 9/1999 | |
| JP | 2000-083239 | 3/2000 | |
| JP | 2000-092502 A | 3/2000 | |
| JP | 2000-101822 | 4/2000 | |
| JP | 2000-358183 | 12/2000 | |
| JP | 2001-053947 A | 2/2001 | |
| JP | 2001-145101 A | 5/2001 | |
| JP | 2002-064709 A | 2/2002 | |
| JP | 2002-271790 A | 9/2002 | |
| JP | 2002-369202 | 12/2002 | |
| JP | 2003-189310 | 7/2003 | |
| JP | 2003-324418 A | 11/2003 | |
| JP | 2004-015501 A | 1/2004 | |
| JP | 2004-056264 | 2/2004 | |
| JP | 2004-072655 A | 3/2004 | |
| JP | 2004-112204 A | 4/2004 | |
| WO | WO 97/30550 | 8/1997 | |
| WO | WO 00/18131 | 3/2000 | |
| WO | WO 00/31964 | 6/2000 | |

OTHER PUBLICATIONS

Kuriki; Eye-Contact Imaging Technology; *Optronics*; No. 3.; c. 1999; pp. 134-139.

Chinese Office Action, w/ English translation thereof, issued in Chinese Patent Application No. CN 200580003640.7 dated on Sep. 12, 2008.

International Preliminary Report on Patentability and Written Opinion of the International Searching Authority, issued in corresponding International Patent Application No. PCT/JP2005/002922, mailed Nov. 2, 2006.

Japanese Office Action, with English translation, issued in Japanese Patent Application No. 2005-047869, mailed Jun. 22, 2010.

European Search Report issued in European Patent Application No. EP 05719430.0 dated Aug. 18, 2010.

Japanese Notice of Reasons for Rejection, w/ English translation thereof, issued in Japanese Patent Application No. JP 2005-047869 dated Mar. 8, 2011.

* cited by examiner

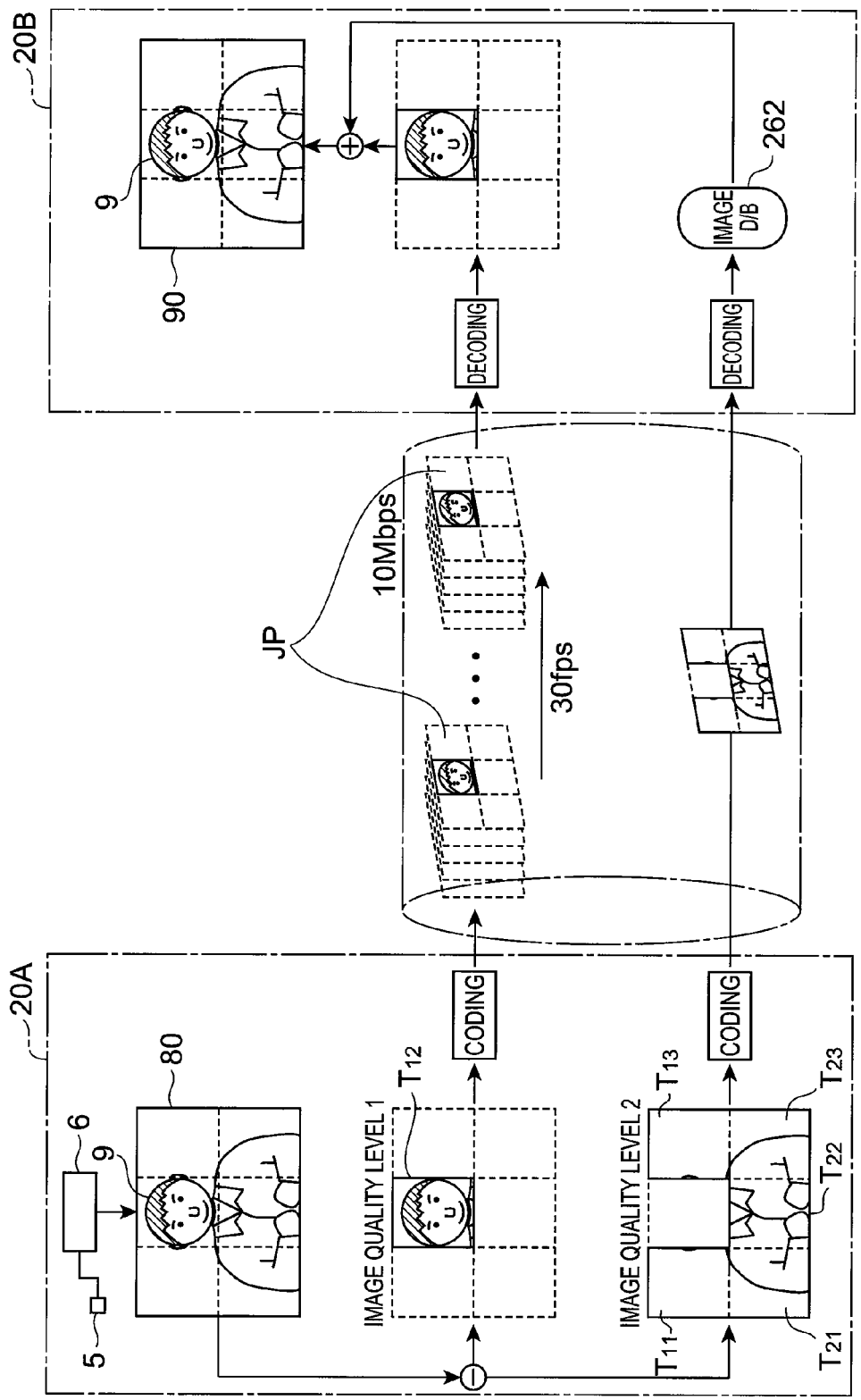

CODING METHOD FOR MOTION-IMAGE DATA, DECODING METHOD, TERMINAL EQUIPMENT EXECUTING THESE, AND TWO-WAY INTERACTIVE SYSTEM

RELATED APPLICATIONS

This application is a Divisional of U.S. application Ser. No. 11/063,734, filed on Feb. 24, 2005 now abandoned, claiming priority of Japanese Application Nos. 2004-128890, filed on Apr. 23, 2004, and 2004-250854, filed on Aug. 30, 2004, the entire contents of each of which are hereby incorporated by reference.

BACKGROUND OF THE INVENTION

1. Field of the Invention

The present invention relates to an image processing technology suitably applicable to interactive environments specific to two-way interactive systems constructed of a plurality of terminal equipments connected to a network and, more particularly, to coding and decoding methods for motion-image data transmitted and received between the terminal equipments, and other techniques.

2. Related Background Art

Proposals have been made in recent years about two-way interactive systems for realizing intimate dialogue interactions such as video conferencing and counseling between or among interlocutors at remote places while displaying an image of an each other's partner interlocutor in an eye contact state with each other on a monitor. A variety of techniques have been proposed heretofore about this eye contact technology, and eye contact is achieved by placing an imaging device such as a CCD camera at a predetermined position of the monitor displaying the partner interlocutor image (cf. Japanese Patent No. 3074677).

SUMMARY OF THE INVENTION

The Inventors investigated the two-way interactive systems as described above and found the following problem. Namely, for mutually transmitting motion-image data of interlocutors through predetermined transmission means, the current communication environments have limitations of line transmission capacity and image processing capability, and it is common practice to effect data compression. As a motion-image compression method in such situations, the MPEG method is commonly used in movie delivery services and others. However, since this MPEG method involves compression in the time-axis direction as well, it inevitably causes a delay of display in a real-time interactive dialogue, and it thus had the problem that it could not achieve a smooth interactive dialogue between remote places.

On the other hand, the Inventors introduced psychological speculations on the dialogues in the state of eye contact as in the above-described two-way interactive systems, and found out that the visual axis of the interlocutors during the dialogues was mostly concentrated on the face of the interactive partner and or on motion of hands as a nonverbal expression in order to observe expressions of the interactive partner. The Inventors discovered that in this case there was no need for sequentially transmitting the entire screen including the interactive partner image during a dialogue but the motion-image transmission could be made with focus on an important observation region during the dialogue, i.e., a Region of Interest (ROI) for the interlocutor, such as the interlocutor's face or motion of hands, thereby reducing the volume of data transmitted, and that it was very effective to achieve implementation of fast responsiveness in the two-way interaction.

An example of the known image processing with focus on only the ROI in this manner is the JPEG2000 Part-I ROI coding. This ROI coding is the image processing technology for achieving the better picture quality of the ROI than that of a region of no interest. The JPEG2000 system is generally known as a compression method for still images, and is a method of compressing image data through discrete wavelet transform, scalar quantization, and processing corresponding to entropy coding and rate control (EBCOT: Embedded Block Coding with Optimized Truncation). The ROI coding achieves the better picture quality of the ROI than that of the region of no interest, by setting higher wavelet coefficients in the ROI set in the still images than those in the region of no interest.

In the JPEG2000 Part-I ROI coding, however, there is the difference between compression levels for the region of interest and for the region of no interest, but the total code length is invariant. Thus, it is unable to lighten the coding process itself and also unable to reduce the volume of resultant coded data to be transmitted. In addition, the ROI coding is implemented by adjustment of wavelet coefficients, but the wavelet coefficients are calculated using a plurality of spatial pixels, which caused the problem that a boundary was blurred between the ROI and the region of no interest in a decoded still image and it did not allow an image processing operation such as a work of embedding only the ROI in another image.

The present invention has been accomplished in order to solve the problem as described above, and an object of the present invention is to provide a coding method for motion-image data, a decoding method, a computer program executing these, a recording medium storing the computer program, terminal equipment executing these, and a two-way interactive system incorporating the terminal equipment, with a structure for effectively reducing a load of processing on each terminal equipment and achieving increase in speed of the processing, as an image processing technology suitably applicable to a two-way interactive system composed of a plurality of terminal equipments connected to a network.

A coding method for motion-image data according to the present invention is an image processing technology of sequentially compressing each of image frames constituting motion-image data along the time axis, and image processing technology enabling effective use of resources in an operating environment wherein significant information is included in only a partial region in a screen frame to be displayed, as in the aforementioned two-way interactive system, and also enabling real-time data transmission/reception. Each of image frames constituting the motion-image data is equivalent to a still image. The background can be regarded as a still image in a video of a human image. Therefore, the present invention is also effective to transmission of document data (texts, photographs, videos, etc.) created by software applications such as PowerPoint (registered trademark of Microsoft), spreadsheet software (e.g., "Excel" and others), word-processing software (e.g., "Word" and others), and browsing software. Namely, display data created by such application software involves frequent occurrence of partial change (e.g., cursor movement, additional display of characters, etc.) with passage of time, and can also be handled as motion-image data as a whole by regarding display data at intervals of a certain time each as one image frame. For this reason, the motion-image data in the present specification embraces video data captured by imaging equipment or the like and also embraces the display data created by the aforementioned application software or the like, combinations of still images with videos, and so on. A data file created by the aforementioned application software or the like is once transformed into image data and thereafter subjected to processing such as compression.

Specifically, a coding method for motion-image data according to the present invention is a method comprising a step of, prior to image compression, dividing an image frame to be coded among image frames constituting motion-image data, into a plurality of sub-regions, and a step of grouping each of the sub-regions into either of a region of interest set in the image frame and a region of no interest different from the region of interest. Then the coding method for the motion-image data compresses each of the sub-regions so that a code length of a sub-region grouped into the region of interest (hereinafter referred to as ROI) out of the plurality of sub-regions is larger than a code length of a sub-region grouped into the region of no interest (hereinafter referred to as non-ROI), thereby generating coded data of each image frame. The shape of the sub-regions of each image frame does not have to be limited to rectangular shapes such as a square and rectangles, but may be one of various polygonal shapes such as triangles, rhomboids, trapezoids, and parallelograms. Furthermore, these sub-regions may be comprised of those of mutually different shapes such as a combination of plural types of polygons, or shapes including curves forming a part of a circular, elliptical, or other shape. In the description hereinafter, however, these sub-regions will be described as rectangular regions, for simplicity of description.

As described above, the coding method for motion-image data according to the present invention is the method of individually compressing each of the image frames constituting the motion-image data along the time axis, and is thus excellent in fast responsiveness, different from the MPEG method which involves simultaneous compression in the time-axis direction as well. Since the coding method for the motion-image data individually compresses each of the image frames constituting the motion-image data, it can make use of JPEG2000 (hereinafter also referred to as JP2) being a still image compression method, for example. A plurality of methods have been proposed heretofore as to this JP2, and all the methods are applicable to the present invention; the aforementioned Part-I method as an example is a license-free technology that can be commonly used. For example, the technology of dividing one image frame into a plurality of rectangular regions can be readily implemented by making use of the tiling technology in JP2. The tiling in JP2 herein is a technique using small processing units to enable coding and parallel processing of large-scale images, and technique of dividing one image frame into a plurality of tiles (corresponding to the aforementioned rectangular regions) and permitting individual handling of these tiles of the divided frame.

Accordingly, the coding method for the motion-image data can be realized with effect equivalent to that by the conventional ROI coding, by making use of the existing JP2 technology, in conjunction with the steps of grouping each of the plurality of rectangular sub-regions into either of the ROI and the non-ROI and adjusting the compression level for each of the rectangular regions in accordance with the correspondence relations between them. In the coding method for the motion-image data, the rectangular sub-regions are coded at different compression levels, and thus no blur occurs at the boundary between the ROI and the non-ROI, different from the conventional ROI coding.

The ROI may be preliminarily set by a user himself or herself, or the setting of the ROI may be altered on the way of communication. Furthermore, it can also be contemplated that a sub-region in which a motion of an image is detected, out of the plurality of sub-regions is automatically grouped into the ROI.

In the coding method for motion-image data according to the present invention, a plurality of rectangular regions may be grouped into the ROI and in this case, they are preferably compressed so that their code lengths are different from each other. This is based on the aforementioned Inventors' knowledge, which is the fact discovered from the psychological speculations on the dialogue interactions in the eye contact state as in the two-way interactive systems that the visual axis of the interlocutors during the dialogues is mostly focused on the face of the interactive partner and the motion of hands as a nonverbal expression in order to observe the expressions of the interactive partner. Namely, as long as a look of the interactive partner, motion of the head, motion of hands, motion of the upper body, etc. are displayed at high speed (e.g., 30 frames/second (fps); delay of not more than 200 msec), there is no need for transmission of information such as the background and a fine pattern of clothing. Among the expressions of the interactive partner, however, delicate changes of eye lines, eyes, and eyebrows have to be displayed in the highest definition and at the highest speed, while, as to the motion of hands as a nonverbal expression, it is important to display the motion of hands and movement of outlines with fast responsiveness. In that case the picture quality of the hands themselves may be degraded, with little influence on the essence of the dialogue. Therefore, in consideration of the interactive environments specific to the two-way interactive system, the ROI is more preferably divided into a high-resolution and high-speed display region including the face and head in a high resolution and with a fast response during the dialogue, and a middle-resolution and high-speed display region including the hands, arms, breast, and so on. In this case, the non-ROI is allocated as a low-resolution and low-speed display region including the background and others. The classification of the interior of the image frame into plural types of regions with varying steps of compression levels in consideration of the degrees of influence on the dialogue as described above is more effective in implementing the smooth two-way interaction in a reduced state of the image processing load.

In the coding process for the rectangular regions in the non-ROI out of the plurality of rectangular regions, the code length of the rectangular regions may be 0 during a certain period of time (which means that the non-ROI is not coded), in consideration of the degree of influence of each region in the image frame on the dialogue. It is because a pasted display of a high-resolution still image is rather effective, for example, for the background included in the low-resolution and low-speed display region corresponding to the non-ROI. For example, in the case of a remote interaction at home, the inside of the house can be photographed to the minimum. It is contemplated that in future only a person is extracted and images selected from a database (rectangular regions) are pasted to the entire background. In practice, the non-ROI such as the background is coded at only intervals of a fixed period, and only the ROI such as a person's face is coded; since a boundary is clear between these ROI and non-ROI in the coding method for motion-image data, it is effective to paste a previous image previously decoded, to the corresponding rectangular regions during the period in which the non-ROI is not coded. Particularly, in this case, the total coding process of the image frame can be lightened, and we can also expect software implementation of the coding.

In the coding method for motion-image data according to the present invention, coded data corresponding to each rectangular region grouped into the ROI out of the plurality of rectangular regions may be further encrypted. However, the object to be encrypted is not limited to only the ROI, but may be optionally set by the user. This is important particularly for protection of privacy of interlocutors using the two-way interactive system. The reason is that the two-way interactive system achieving the eye contact state between interlocutors as described above is promising for application not merely to the video conferencing systems used in business scenes, but also to therapy systems such as counseling for people with aftereffects due to disasters or accidents. On the other hand, the two-way interactions require real-time encryption and decryption, and thus, the encryption of only the significant region during the dialogue enables more efficient image processing. The significant region during the dialogue (ROI) is mainly the face of the interactive partner image, and it is very difficult to specify each individual unless this part can be discriminated. Therefore, the privacy of interlocutors can be well protected by selectively encrypting only the ROI being the high-resolution (low compression rate) and high-speed display region. The voice is also important for identifying an individual, and it becomes feasible to construct stronger security, by encryption thereof independent of the image.

In the coding method for motion-image data according to the present invention, an image frame forming the motion-image data may be divided so that one rectangular region corresponds to the ROI. In this case, the division number of rectangular regions can be reduced. On the other hand, the size of the ROI set at a start of a dialogue can be varied during the dialogue. For this reason, the divisional size of rectangular regions is dynamically changed according to the size variation of ROI, which enables more efficient load sharing of image processing. Even in a case where the size of rectangular regions is not changed according to the size variation of ROI, it is also possible to dynamically change the rectangular region grouped into the ROI, according to the size variation of the ROI. The size of the ROI may also be optionally changed during the dialogue by the interlocutor himself or herself by use of an input means such as a mouse. The term "dynamically" in the present specification embraces a case wherein the user optionally changes the setting according to circumstances, as well as the case where the setting automatically follows changes of circumstances.

The size and the correspondence relations of the rectangular regions are changed during the dialogue as described above because there are considerable differences among people in the motion of hands and others, different from the motion of the eyes, mouth, and face. Namely, instead of always performing the fixed compression for hands at rest, the compression rate and division size are adaptively adjusted according to a person with large change in the motion of hands, a person with less change in the motion of hands, and a situation of the interaction at that point, different from a fixed compression rate and fixed division, so as to enable better image processing.

Where the JP2 technology is applied to the coding method for motion-image data as described above, the compression level can be varied for each rectangular region (tile) resulting from division by tiling (so that the code length decreases with rise of the compression level), with effect substantially equal to that by the ROI coding, and the coded data can be readily decoded by the JP2 technology. However, where the code length is 0 for the rectangular regions grouped in the non-ROI in the image frame being an object to be coded, the image of the non-ROI cannot be obtained even if the coded data of the image frame is decoded by the JP2 technology. The decoding in this case (a decoding method for motion-image data according to the present invention) is effected as follows.

First, coded data compressed as the rectangular regions grouped in the ROI is decoded, and corresponding rectangular regions of another image frame previously stored after decoded are prepared as the rectangular regions grouped in the non-ROI. Then the decoded rectangular regions in the ROI are combined with the corresponding rectangular regions of the other image frame thus prepared, thereby generating a new image frame. Here the compression for each rectangular region and the control of display quality are preferably dynamically changed while monitoring the performance of a CPU performing processing and the line performance of the network.

Furthermore, the coding method for motion-image data according to the present invention may comprise a step of embedding an image obtained from an information source different from the motion-image data being an object to be transmitted (i.e., a part of a still image or a part of an image frame of a motion image not causing any trouble in the interaction even at a low compression level) in a portion of an image frame to be coded, e.g., a rectangular region corresponding to the non-ROI, whereby a more realistic interaction can be realized without being limited by the current communication environments such as the bandwidth or image processing performance.

Specifically, first, a virtual image frame comprised of a plurality of sub-regions is set as an image frame to be coded, and these sub-regions are handled as tiles being processing units in the tiling of JP2. Then a clipped image obtained from an information source different from the motion-image data is allocated to each of these sub-regions, while at least one of the plurality of segmental images out of the image frame to be coded among the image frames constituting the motion-image data (motion image of the interactive partner) is allocated together. The clipped image allocated herein can be a still image or a motion image captured by digital equipment such as a camera or a scanner, e.g., a portion clipped from a monitor image (still image) entered through a keyboard (hereinafter referred to as a text image), a monitor image of handwritten characters by use of a whiteboard function with a light pen (a portion clipped from a still image (hereinafter referred to as a whiteboard image)), or a portion of an image frame forming another motion-image data. The total size and the number of sub-regions of the virtual image frame newly set do not have to be the same as those of the image frames of the motion-image data being the original coding object. Although the size of the sub-regions forming the virtual image frame does not have to be the same as that of the sub-regions of the image frames of the motion-image data being the original coding object, they are more preferably the same for the reason of no need for an image dividing process.

When the tiling technology of JP2 is applied to each of the plural types of images allocated to the plurality of sub-regions forming the virtual image frame as described above, these plural types of images corresponding to tiles can be individually coded at mutually different compression levels. This enables individual compression according to the coding level set for each of these sub-regions, thereby generating coded data of each virtual image frame.

When virtual image frames, each being set as an image frame of motion-image data being an object to be coded, are sequentially coded along the time axis as described above, coded data is obtained for reproduction of a motion image each frame of which is a mixture of a still image with one image frame of a motion picture.

Each of the sub-regions forming the above virtual image frame may be grouped into either of an ROI set in the virtual image frame or a non-ROI different from the ROI. In this case, as in the aforementioned configuration, each of the sub-regions is preferably compressed so that a code length of a sub-region grouped into the ROI is larger than a code length of a sub-region grouped into the non-ROI.

The foregoing ROI may be preliminarily set by the user himself or herself, or the setting thereof may be changed during use. Furthermore, a sub-region in which a motion of an image is detected, out of the plurality of sub-regions may be grouped into the ROI.

In the coding method for motion-image data according to the present invention, coded data of an image allocated to at least one of the sub-regions forming the virtual image frame may be further encrypted. In the coding process for at least one of these sub-regions, the code length of the sub-region may be 0 during a certain period of time. In this case, an image frame for display (comprised of a decoded image and an image embedded in the region with the code length of 0) is obtained by embedding an image prepared in advance, in the pertinent region on the side performing the coding process. The virtual image frame set as described above is also preferably compressed each by JPEG2000.

The coding and decoding methods for motion-image data as described above are executed at each terminal equipment in the two-way interactive system. This terminal equipment comprises at least a display device for displaying an image of an interactive partner, an image taking unit for imaging the interlocutor located in front of the display device, a controller for executing the coding and decoding methods for motion-image data, and an input/output unit for sending coded data compressed by the controller, to transmission means.

The coding and decoding methods for motion-image data as described above may be a program to be executed by a computer or the like and in this case, the program may be delivered through a network, either wired or wireless, or may be stored in a recording medium such as a CD, a DVD, or a flash memory.

Each of embodiments according to the present invention can be further fully understood in view of the following detailed description and accompanying drawings. These embodiments will be presented merely for illustrative purposes but should not be understood as limiting the present invention.

The scope of further application of the present invention will become apparent from the following detailed description. It is, however, noted that the detailed description and specific examples will describe the preferred embodiments of the present invention and that they are presented for illustrative purposes only, and it is apparent that various modifications and improvements falling within the spirit and scope of the present invention are obvious to those skilled in the art, in view of the detailed description.

BRIEF DESCRIPTION OF THE DRAWINGS

FIG. 14 is an illustration for conceptually explaining a transmission/reception operation of motion-image data in a two-way interactive system according to the present invention;

DETAILED DESCRIPTION OF THE PREFERRED EMBODIMENTS

Each of embodiments of the coding and decoding methods for motion-image data and others according to the present invention will be described below in detail with reference to FIGS. 1-5, 6A, 6B, 7-12, 13A, 13B, 14-18, 19A-19C, and 20-23. The same parts or the same members will be denoted by the same reference symbols in the description of the drawings, without redundant description.

The coding and decoding methods for motion-image data according to the present invention can be executed at terminal equipments connected through a predetermined transmission means, and can be applied, for example, to the two-way interactive system as described in Patent Document 1 cited above.

First, a two-way interactive system to which the terminal equipment executing the coding and decoding methods for motion-image data can be applied will be described herein. This two-way interactive system is a system for achieving a dialogue interaction in an eye contact state, but the terminal equipment including the imaging device can also be applied to two-way interactive systems capable of simply transmitting and receiving motion-image data of an image of an interactive partner, in a configuration incapable of achieving eye contact between interlocutors.

(Two-Way Interactive System and Terminal Equipment)

Figure 1:
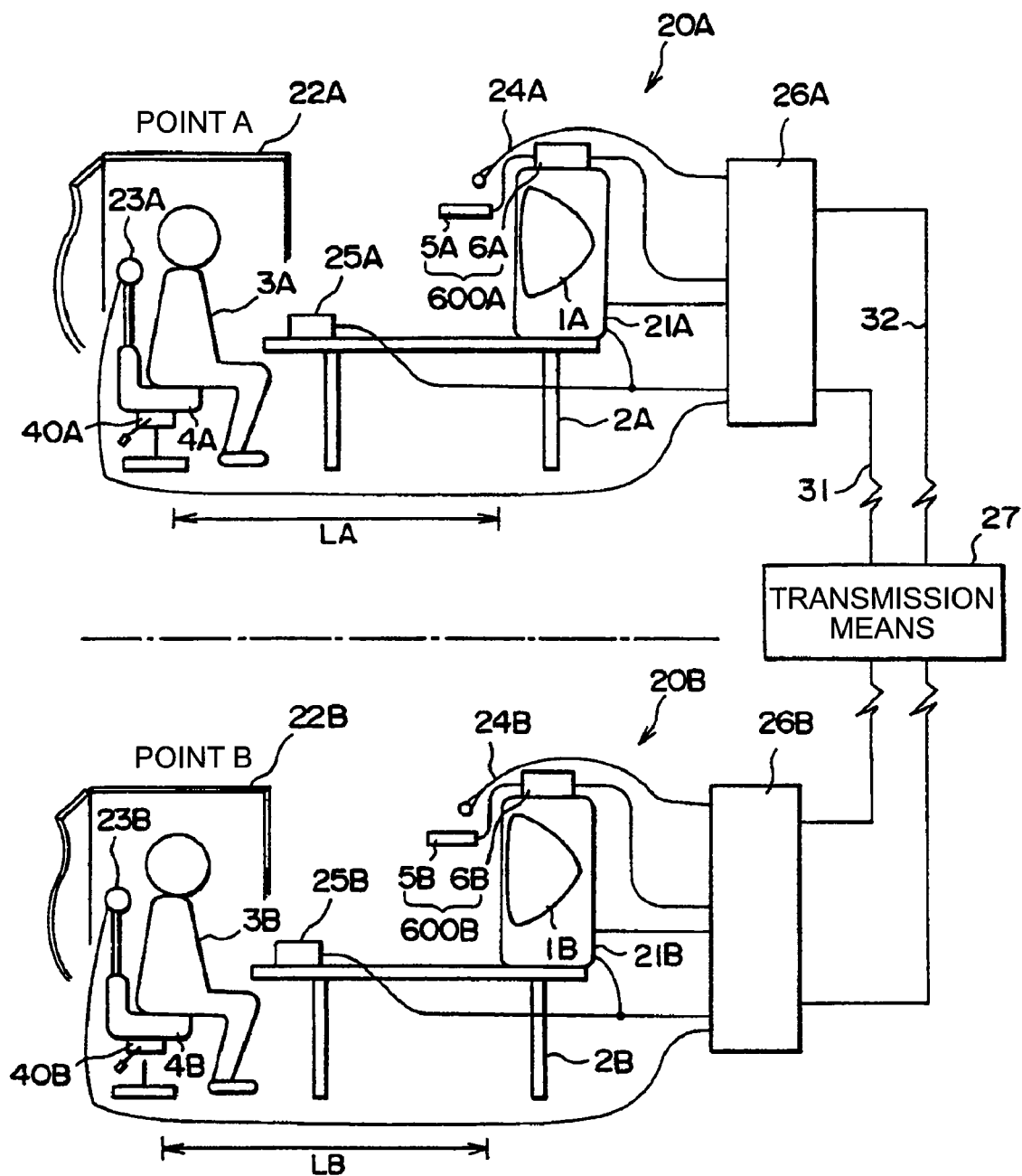
FIG. 1 is an illustration showing a configuration of a two-way interactive system for achieving eye contact through transmission means between different places (terminal equipments and a two-way interactive system according to the present invention)

FIG. 1 is a logical configuration diagram showing the whole of the two-way interactive system enabling eye contact between interlocutors located at different places. This system is a system that achieves a two-way interaction between an interlocutor 3A (first interlocutor) at point A (first site) and an interlocutor 3B (second interlocutor) at point B (second site). This system is a system that establishes an intimate relationship of mutual trust even between interlocutors at different points to realize in-depth communication, and can be used, for example, as a counseling system or a service providing system directed toward learning at home. In such cases, it is assumed that at least one of interlocutors is a service providing person such as a teacher, a medical doctor, or a psychologist. Therefore, this system has various functions and configuration to provide information necessary for these service providing people to provide services and to provide an ideal interactive environment.

Specifically, at point A there are (a) a chair 4A (with a height adjusting mechanism 40A) on which the interlocutor 3A (e.g., a counselor) is sitting, (b) a table 2A at which the interlocutor 3A is sitting, and (c) a terminal equipment 20A with a mechanism for achieving eye contact between the interlocutors through transmission means 27, and the interlocutor 3A is isolated by partition 22A. On the other hand, at point B there are (a) a chair 4B (with a height adjusting mechanism 40B) on which the interlocutor 3B (e.g., a client as a counselee) is sitting, (b) a table 2B at which the interlocutor 3B is sitting, and (c) a terminal equipment 20B with a mechanism for achieving eye contact between the interlocutors through the transmission means 27, and the interlocutor 3B is isolated by partition 22B. The transmission means 27 includes an optical fiber transmission line 31 (main transmission line), a satellite communication transmission line 32 (backup transmission line), and others, for enabling transmission/reception of image information and voice information between the terminal equipment 20A at point A and the terminal equipment 20B at point B. This transmission means 27 may be either wired or wireless. The transmission means embraces a network such as an already laid telephone circuit network, and also embraces a Bulletin Board System (BBS) equipped with various databases.

At point A, the chair 4A functions for defining the position of the interlocutor 3A. This chair 4A is preferably fixed in order to keep the distance constant relative to the display unit (display device) 21A of the terminal equipment 20A. However, even if the chair 4A is not fixed, the distance between the chair 4A and the display unit 21A can be kept constant by setting the table 2A between the interlocutor 3A and the display unit 21A (it is confirmed that the existence of table 2A serves as a psychological distance basis for the interlocutor 3A). The above also applies to the configuration of the terminal equipment 20B at point B where the partner interlocutor 3B (e.g., a counselee or the like) is located.

At point A, the terminal equipment 20A has (1) a display unit 21A with a monitor TV 1A placed on the table 2A, for displaying an image of interlocutor 3B or the like on the basis of image information transmitted through the transmission means 27 from the terminal equipment 20B at point B, (2) a main body unit 6A for holding a CCD camera (image taking unit) 5A at a predetermined position, (3) a sound output unit 23A (speaker) for outputting the voice of the interlocutor 3B on the basis of voice information transmitted through the transmission means 27 from the terminal equipment 20B at point B, and (4) a sound input unit 24A (microphone) for collecting the voice of the interlocutor 3A as voice information and for transmitting the voice information to the terminal equipment 20B at point B. Furthermore, this system has the following components for realizing more in-depth communication as a counseling system: (5) a character/graphic input unit 25A (interfaces such as a keyboard, a pointing device, and a touch-sensitive panel) through which the interlocutor 3A enters characters or graphics, which displays entered characters or graphics on the display unit 21A, and which transmits character/graphic information to the terminal equipment 20B at point B, and (6) an image processing unit 26A (including a controller) disposed between each of the above-described components and the transmission means 27 and arranged to perform signal processing, transmission control, an editing work of video data, and so on. The terminal equipment 20B at point B is constructed in a configuration similar to that of the terminal equipment 20A at point A and, specifically, it has a display unit 21B, an imaging device 600B consisting of a CCD camera 5B and a main body unit 6B, a sound output unit 23B, a sound input unit 24B, a character/graphic input unit 25B, and an image processing unit 26B.

Furthermore, the configuration of the imaging devices 600A, 600B in the terminal equipments 20A, 20B at point A and at point B will be described. For convenience' sake of description, letters A, B to discriminate the points from each other will be omitted for each common component to the terminal equipments 20A, 20B at point A and at point B, for example, like the imaging device 600. Unless otherwise stated in particular, the description will concern the terminal equipment 20A at point A as a general rule, while omitting the redundant description for the terminal equipment 20B at point B having the common configuration.

This imaging device 600 has a CCD camera 5 (5A) as an image taking unit, and a main body unit 6 for setting the CCD camera 5 at a predetermined position while supporting it. The monitor TV 1 (1A) is mounted on the table 2 (2A) and the interlocutor 3 (3A) is sitting on the chair 4 (4A) with the height adjusting mechanism 40 (40A) located the distance L (m) apart from the monitor TV 1. This distance L (LA) is set in the range of not less than 0.5 m and not more than 5 m. The CCD camera 5 of cylindrical shape having the outer diameter $\phi$ of not more than 20 mm and the length of about 100 mm is disposed between the interlocutor 3 to be taken and the monitor TV 1. This CCD camera 5 is so set that its image taking direction is directed to the interlocutor 3 to be taken. The video of the interlocutor 3 taken by the CCD camera 5 is transmitted as image information to the other interlocutor side (i.e., to the terminal equipment 20B at point B through the transmission means 27). The spacing between the display unit 21 and the interlocutor can have slight deviation depending upon the interlocutor. Therefore, it is preferable to select the CCD camera 5 having a wide depth of focus, in order to meet such circumstances.

Figure 2:
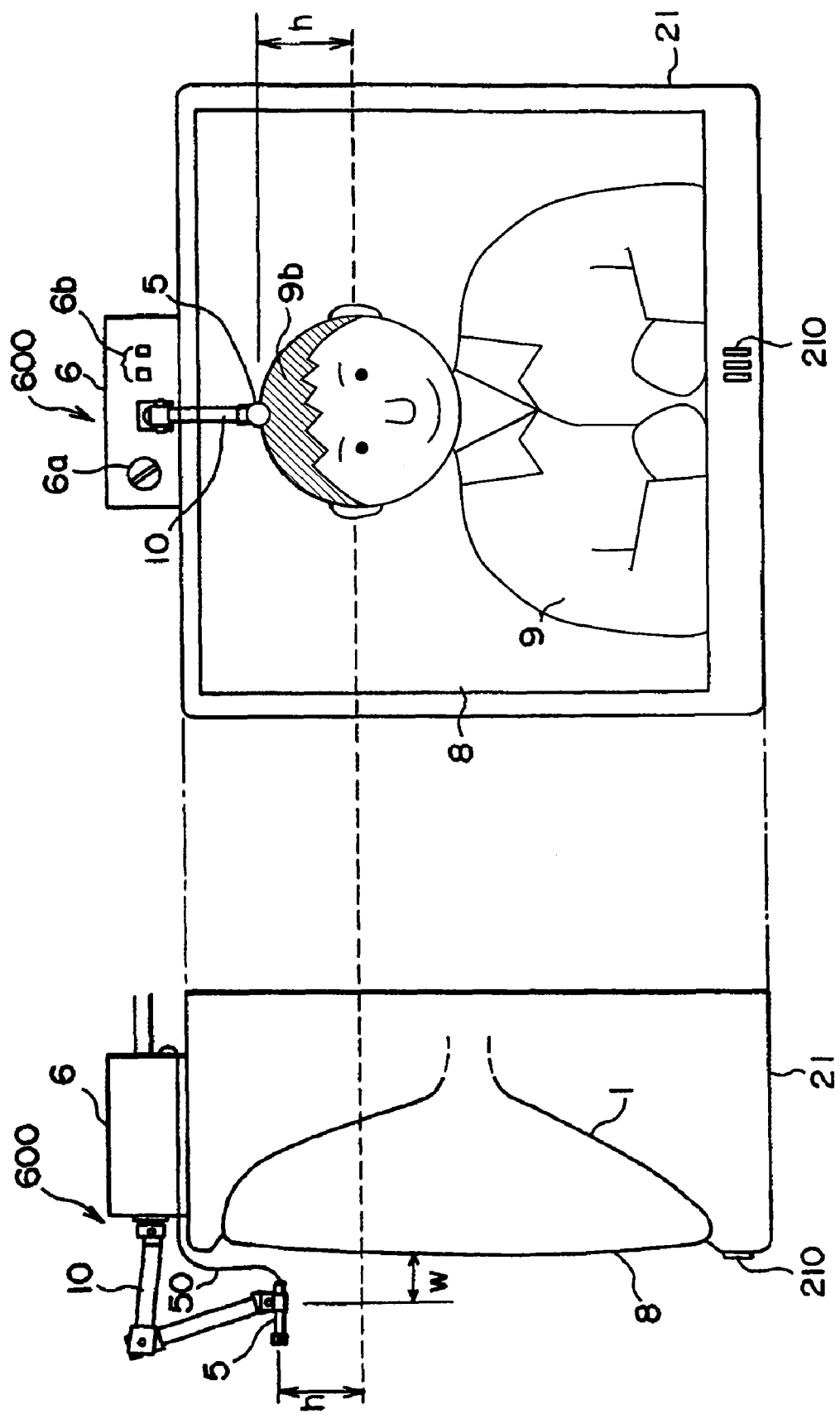
FIG. 2 is an illustration showing an imaging device shown in FIG. 1, and illustration for explaining a method of installing a CCD camera for eye contact.

Next, a specific setting location of the CCD camera 5 will be described with reference to FIG. 2.

First, the main body unit 6 of the imaging device 600 is set on the display unit 21 for displaying the video of the other interlocutor having been transmitted. Switch 210 includes a power switch for turning the power of monitor TV 1 on/off, an image position control switch for horizontally and vertically moving the image displayed on the monitor screen 8, a color correction switch, and so on. The CCD camera 5 is located at a predetermined position in front of the monitor screen 8 displaying the transmitted image 9 of the other interlocutor 3B, by the main body unit 6. A monitor screen of about 4 inches can be enough for use as the monitor screen 8.

Specifically, the CCD camera 5 is located at the position w (cm) ahead the monitor screen 8 and near the head 9a of the interlocutor image 9 displayed on the monitor screen 8. The center axis of the cylindrical CCD camera 5 is located at the position h (cm) above the position of the eyes of the interlocutor image 9 as indicated by a dotted line.

Since the CCD camera 5 is located near the head above the position of the eyes of the interlocutor image 9 displayed on the screen 8 of the monitor TV 1 as described above, it will cause no extra trouble in the two-way interaction. For example, in a case of a system configuration wherein the CCD camera 5 is located h=about 10 (cm) above the position of the eyes (the position indicated by the dotted line in the drawing) of the interlocutor image 9 displayed on the screen 8 and wherein the distance L between the monitor TV 1 and the interlocutor 3 is set at about 2.5 (m), the parallactic angle is 2.3°, which can be well below the parallactic angle of 3° being the detection limit (there is no specific influence on the variation of parallactic angle even in the case where the spacing w between the monitor screen 8 and the CCD camera 5 is about 10 (cm)). Namely, it was confirmed that, as long as the partner's eyes (the eyes of the image of the other interlocutor 3B displayed on the monitor screen 8) were clearly seen in the eye contact state, the camera 5, even if located around the head, caused little trouble in the two-way interaction if the screen 8 of the monitor TV 1 was large. It was also confirmed by experiment that a good two-way interaction could be achieved if the size of the screen 8 was at least approximately 35 cm horizontal and 26 cm vertical. It was also found that if the interlocutors in interaction were acquaintances, the psychological barrier tended to be lowered even in the small size of the screen. Therefore, the screen size may be determined according to usage.

The eye contact state can be achieved by adjusting the position of the CCD camera 5 relative to the monitor screen 8. It can also be achieved by moving the image displayed on the monitor screen 8, relative to the CCD camera 5. For example, where the eye contact is manually achieved, the interlocutor himself or herself moves the CCD camera 5 or controls the switch 210 to move the monitor image. Where the eye contact is automatically achieved, a new driving mechanism for moving the camera is set, or an image recognition technology is used to move the monitor image.

Figure 3:
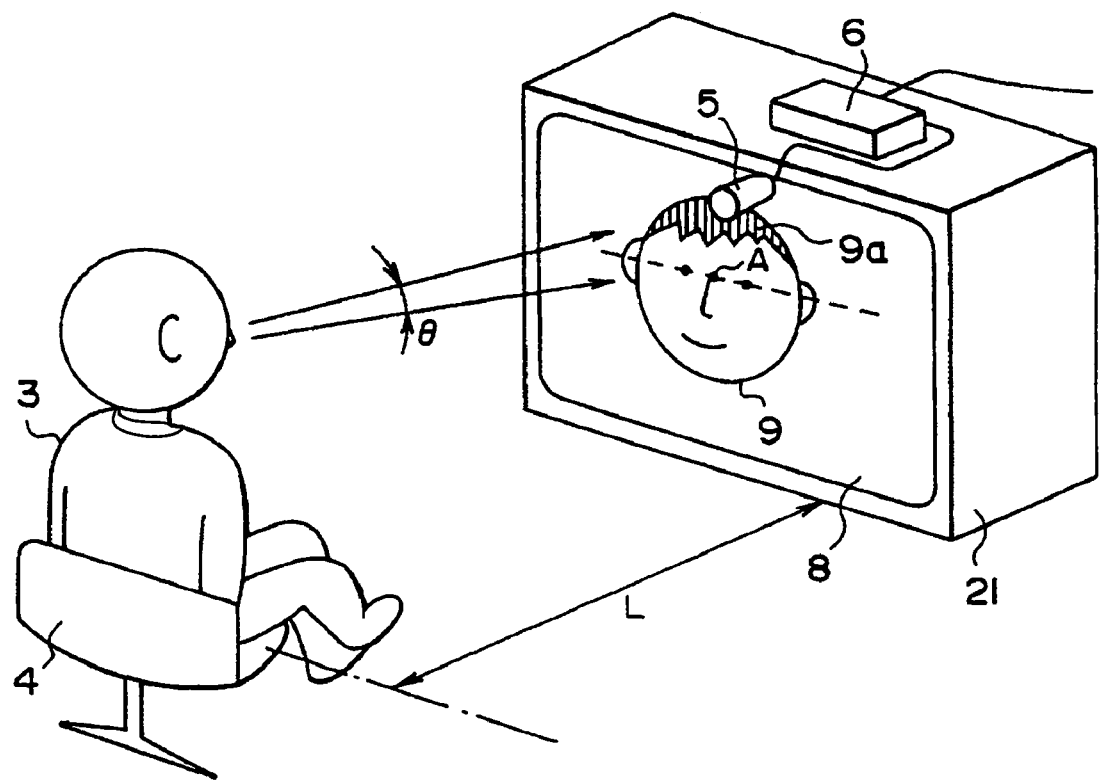
FIG. 3 is an illustration for explaining a parallactic angle.
Figure 4:
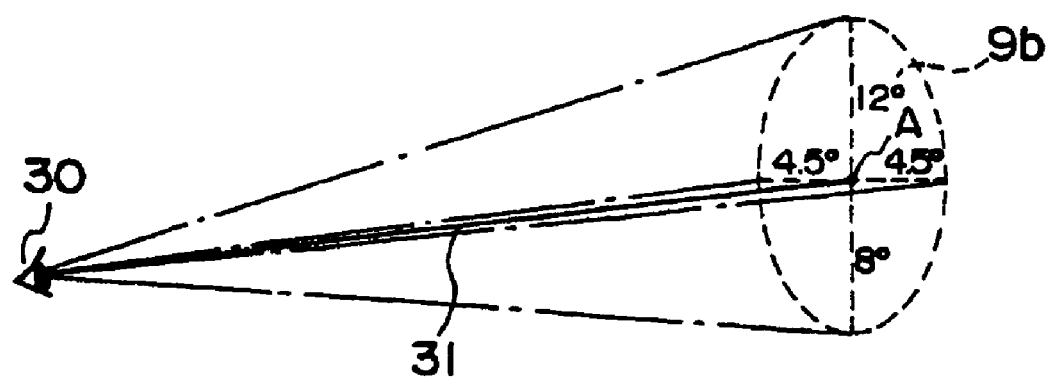
FIG. 4 is an illustration showing a region where the CCD camera should be installed.

Furthermore, the parallactic angle will be described with reference to FIG. 3. In the present specification, the parallactic angle is an angle θ between the visual axis of the photographed interlocutor 3 directed toward the interlocutor image 9 displayed on the monitor screen 8, and the visual axis of the interlocutor 3 directed toward the CCD camera 5, as shown in FIG. 3. In other words, the parallactic angle means an angle of deviation of the setting position of the CCD camera 5 relative to the visual axis of the interlocutor 3. The eye contact stated herein means a state not more than the allowable limit to unnaturalness due to the setting position of the CCD camera 5, as reported in IECE Japan 1967 General Conference (No. 1998). Quantitatively, the eye contact range is defined as follows: the parallactic angle in the horizontal directions is not more than 4.5° (on the both temple sides of the image 9 relative to the center A of the eyes of the interlocutor image 9), not more than 12° immediately above (the head 9b side of the image 9 relative to the image center A), and not more than 8° immediately below (on the body side of the image 9 relative to the image center A). Of course, this parallactic angle is preferably as small as possible, and the detection limit is not more than 3° in the horizontal and vertical directions. Accordingly, the region where the CCD camera 5 can be installed is a conical region as shown in FIG. 4. This conical region is defined by the eye contact region 9b on the monitor screen 8 at the predetermined distance L (m), relative to the visual axis 31 of the interlocutor 3 connecting the eyes 30 of the interlocutor 3 and the center point A of the interlocutor image 9 displayed on the monitor screen 8 (in the present embodiment the center between the two eyes of the interlocutor image 9 is defined as the center point A of the interlocutor image 9), and the position of the eyes 30 of the interlocutor 3.

Where the size of the interlocutor image 9 displayed on the monitor screen 8 is small, the CCD camera 5 does not always have to overlap with the head of the interlocutor image 9. If they overlap, the head of the interlocutor image 9 becomes rather hard to be seen behind the CCD camera 5. The condition for eye contact is that the CCD camera 5 and the eyes of the interlocutor image 9 exist within the region of the parallactic angle of 3° as described above, and, specifically, it is approximately 3 cm (h in FIG. 2) at the position 50 cm apart from the screen. Therefore, the eye contact state is maintained even with a shift between the CCD camera 5 and the head of the interlocutor image 9 within this range. The shift between the interlocutor image 9 and the CCD camera 5 can be achieved, for example, by controlling the display position of the image on the monitor screen 8 or by adjusting the support part of the CCD camera 5 to change the position of the CCD camera 5 itself.

The Inventors conducted the psychological study on the interaction in the eye contact state in the two-way interactive system having the structure as described above and discovered that the visual axis of the interlocutor during the interaction was mostly concentrated on the face of the interactive partner or on the motion of hands as a nonverbal expression in order to observe the expressions of the interactive partner. The Inventors discovered that in this case there was no need for sequentially transmitting the entire screen including the interlocutor image during the interaction, and the volume of data transmitted could be reduced by transmission of a motion image with focus on only an important observation area during the interaction, i.e., the Region of Interest (ROI) for the interlocutor such as the interlocutor's face and the motion of hands, and it was very effective in implementation of fast responsiveness in the two-way interaction. Then the coding and decoding methods for motion-image data according to the present invention realize effective reduction of the processing load and increase in the speed of the processing, in the case of the image processing including the ROI in each image frame of motion-image data transmitted and received as in the two-way interactive system. The coding and decoding methods for the motion-image data are executed in the terminal equipment.

(Terminal Equipment)

Figure 5:
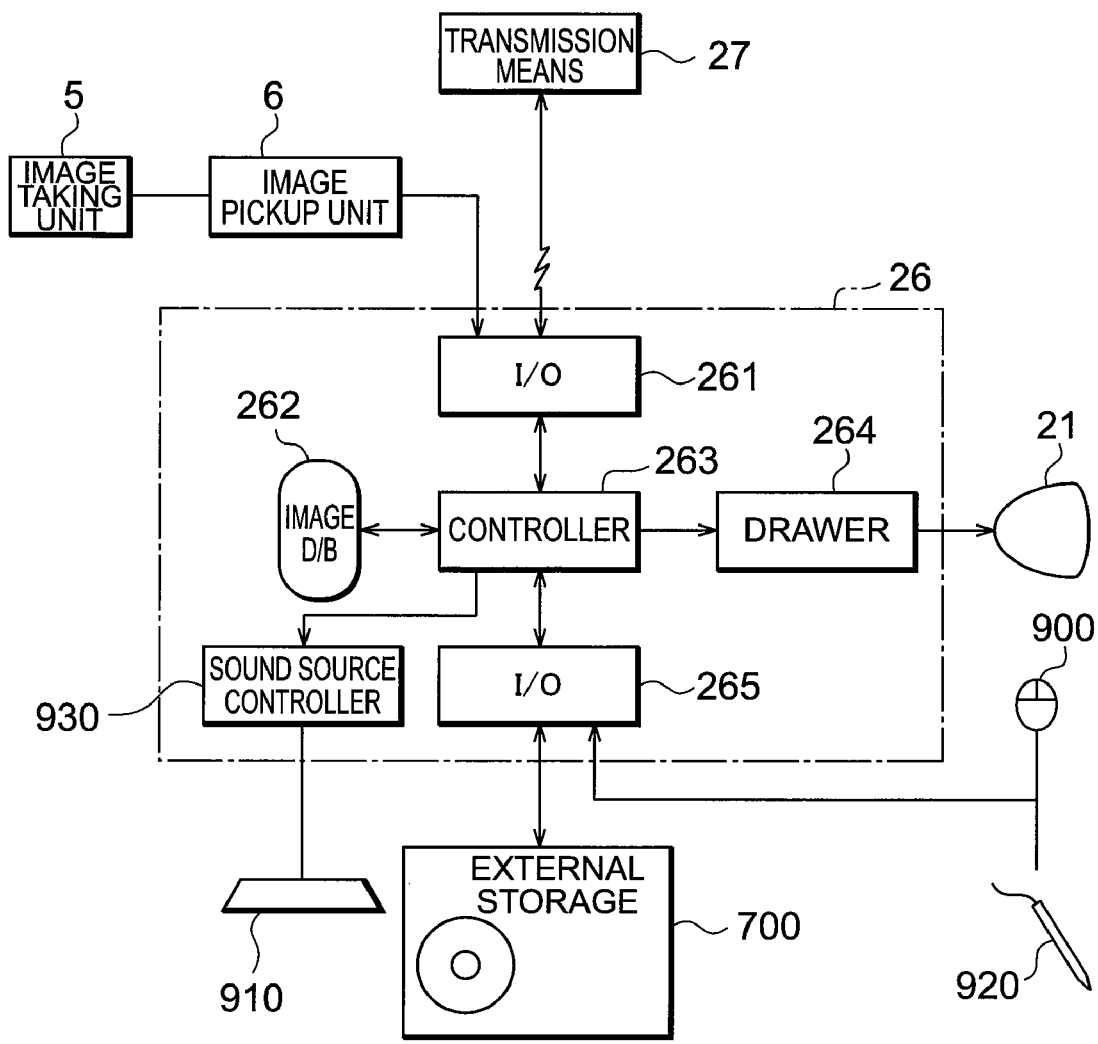
FIG. 5 is a block diagram showing a configuration of a terminal equipment according to the present invention.

FIG. 5 is an illustration showing a configuration of a terminal equipment for executing the coding and decoding methods for motion-image data according to the present invention. This terminal equipment has a display device 21 such as a monitor (corresponding to the display units 21A, 21B in the two-way interactive system shown in FIG. 1), an image processing unit 26 (corresponding to the image processing devices 26A, 26B in the two-way interactive system shown in FIG. 1), an external storage device 700, a pointing device 900 such as a mouse, a touch pen 920, an imaging device 600 consisting of an image taking unit, such as a CCD camera 5 for taking an image of an interlocutor located in front of the display device 21, and an image pickup unit 6, and a speaker 910. The image processor 26 has a data input/output part 261 (I/O in the drawing) for performing retrieval of image information and other information media from the image pickup unit 6 in the imaging device, and transmission/reception of motion-image data (coded data) of an interactive partner through transmission means 27, a controller 263 for executing the coding and decoding methods for motion-image data according to the present invention, an image database 262 (image D/B in the drawing) for storing motion-image data transmitted and received, a drawer 264 for making the display device 21 display a predetermined pattern in accordance with a command from the controller 263, a data input/output part 265 (I/O in the drawing) for enabling retrieval of position data from the pointing device 900 such as the mouse, and data exchange with the external storage device 700, and a sound source controller 930 for controlling the speaker 910 from which the partner's voice is emitted.

The external storage device 700 includes, for example, a magnetic tape, CD, optical disk, hard disk, DVD, flash memory, or the like, and stores a computer program for executing the coding and decoding methods for motion-image data according to the present invention, motion-image data of the interactive partner, and so on.

(Coding and Decoding Methods for Motion-Image Data)

Figure 6A:
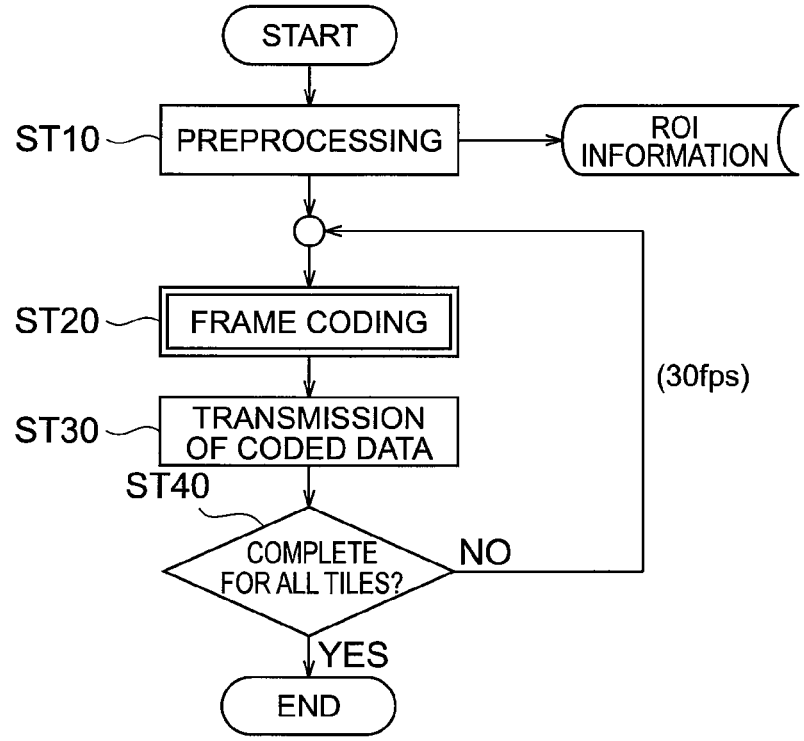
FIGS. 6A and 6B are flowcharts for explaining a transmission operation and a reception operation of motion-image data, respectively, carried out at each terminal equipment.

The coding and decoding (the coding and decoding methods for motion-image data according to the present invention) to be executed in the controller 263 of the terminal equipment having the structure as described above will be described below. FIG. 6A is a flowchart for explaining a transmission operation of motion-image data carried out at each terminal equipment, and FIG. 6B a flowchart for explaining a reception operation of motion-image data carried out at each terminal equipment. FIG. 7 is a flowchart for explaining frame coding (the coding method for motion-image data according to the present invention) in the transmission operation of motion-image data in FIG. 6A. It is assumed that the coding and decoding of the image frame forming the motion-image data described below is carried out by the JP2 technology.

In the transmission operation of motion-image data, as shown in the flowchart of FIG. 6A, the first step is to perform a preprocessing step of setting an ROI in an image frame, prior to a dialogue (step ST10). The ROI information set at this step ST10 is once stored into the memory, and the controller 263 sequentially codes each of image frames forming the motion-image data, along the time axis, using the stored ROI information (step ST20). This frame coding is carried out as the controller 263 executes the computer program retrieved through I/O 265 from the external storage device 700.

The controller 263 sequentially sends coded data coded by the foregoing frame coding (step ST20), through I/O 261 to the transmission means 27 (step ST30). These frame coding and transmission operation of coded data are executed at the processing speed of 30 frames/sec until an end of the dialogue (step ST40).

Figure 6B:
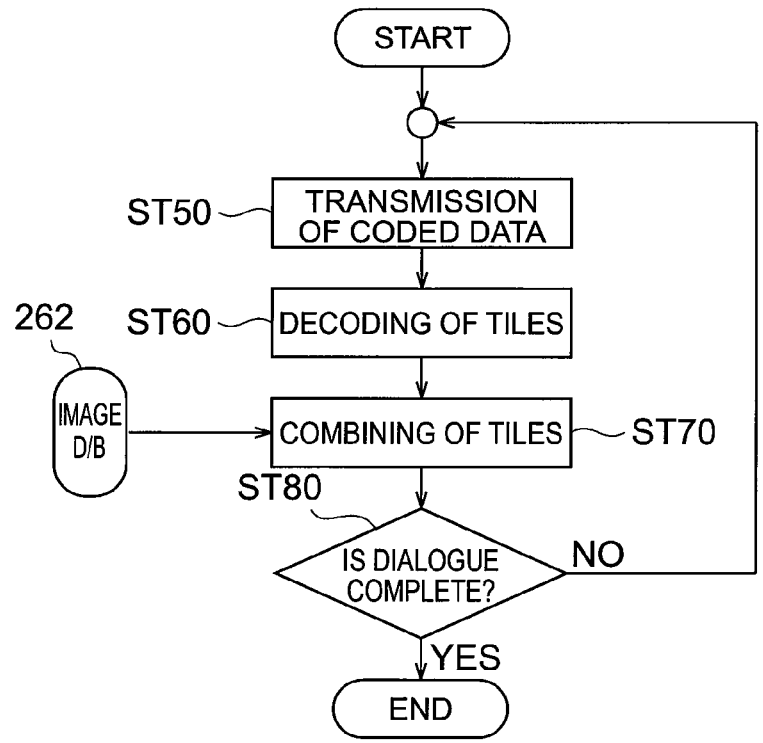
Figure 7:
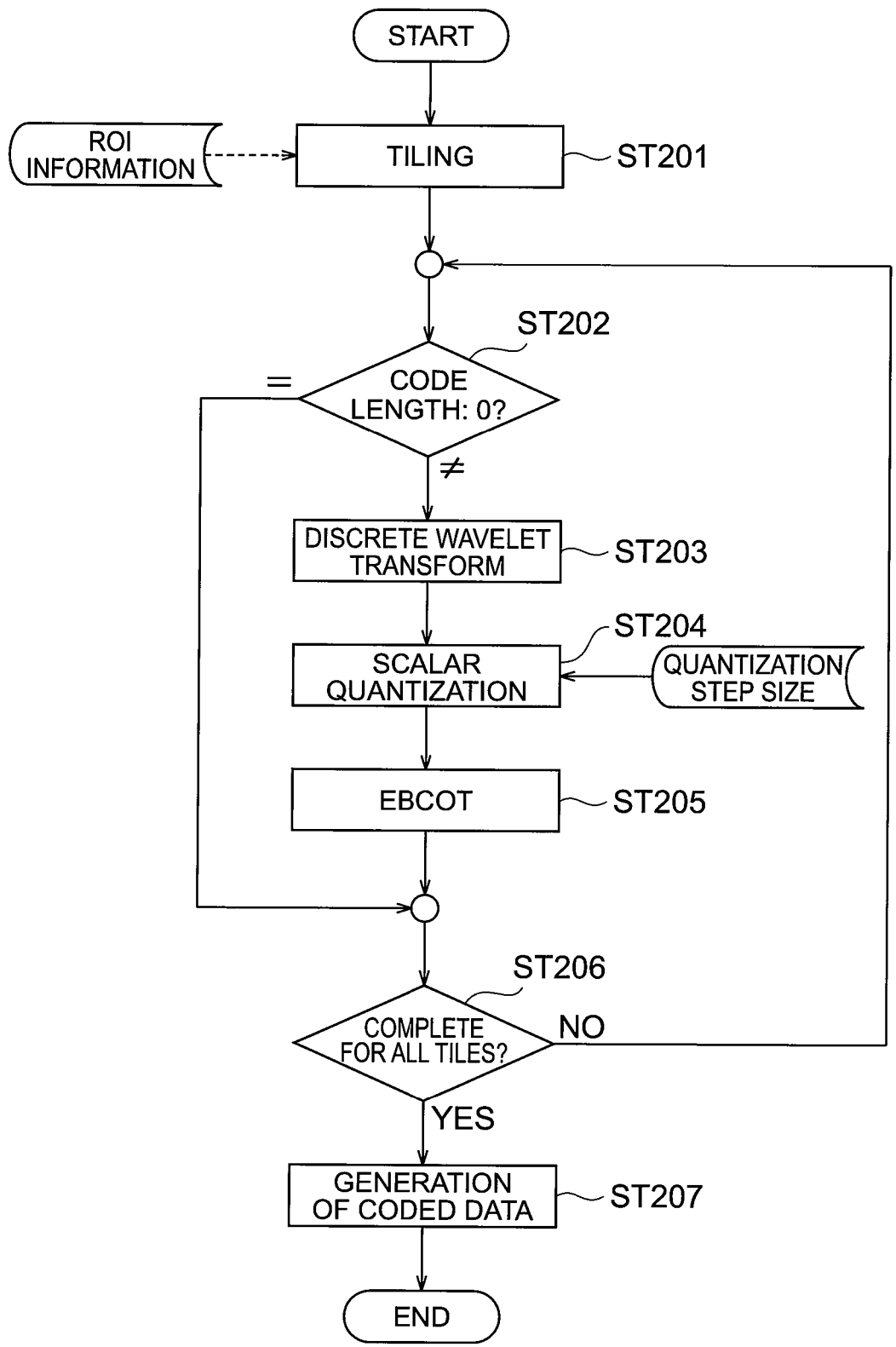
FIG. 7 is a flowchart for explaining frame coding in the transmission operation of motion-image data shown in FIG. 6A (a coding method for motion-image data according to the present invention)

In the reception operation of motion-image data on the other hand, as shown in the flowchart of FIG. 6B, the controller 263 sequentially receives coded data of image frames through I/O 261 from the transmission means 27 (step ST50), and performs decoding of rectangular regions (tiles) forming each of the image frames (step ST60). Then the controller 263 performs a combining work of combining tiles decoded at an end of decoding of all the tiles for each image frame, to generate a new image frame to be displayed on the display device 21 (step ST70). If the code length of the tiles corresponding to the non-ROI in the received coded data is 0, the combining work is carried out using an image preliminarily stored in the image D/B 262, as a corresponding tile image, so as to generate an image frame to be displayed. The above-described decoding process is sequentially carried out until an end of the dialogue (step ST80).

Furthermore, the frame coding in the flowchart of FIG. 6A will be described in detail with reference to the flowchart of FIG. 7.

The controller 263 divides an image frame by making use of the tiling technology of JP2 (step ST201), and groups each of all the tiles resulting from the division, into rectangular regions included in the ROI or into rectangular regions included in the non-ROI, based on the ROI information set in the preprocessing step (step ST10).

Figure 8:
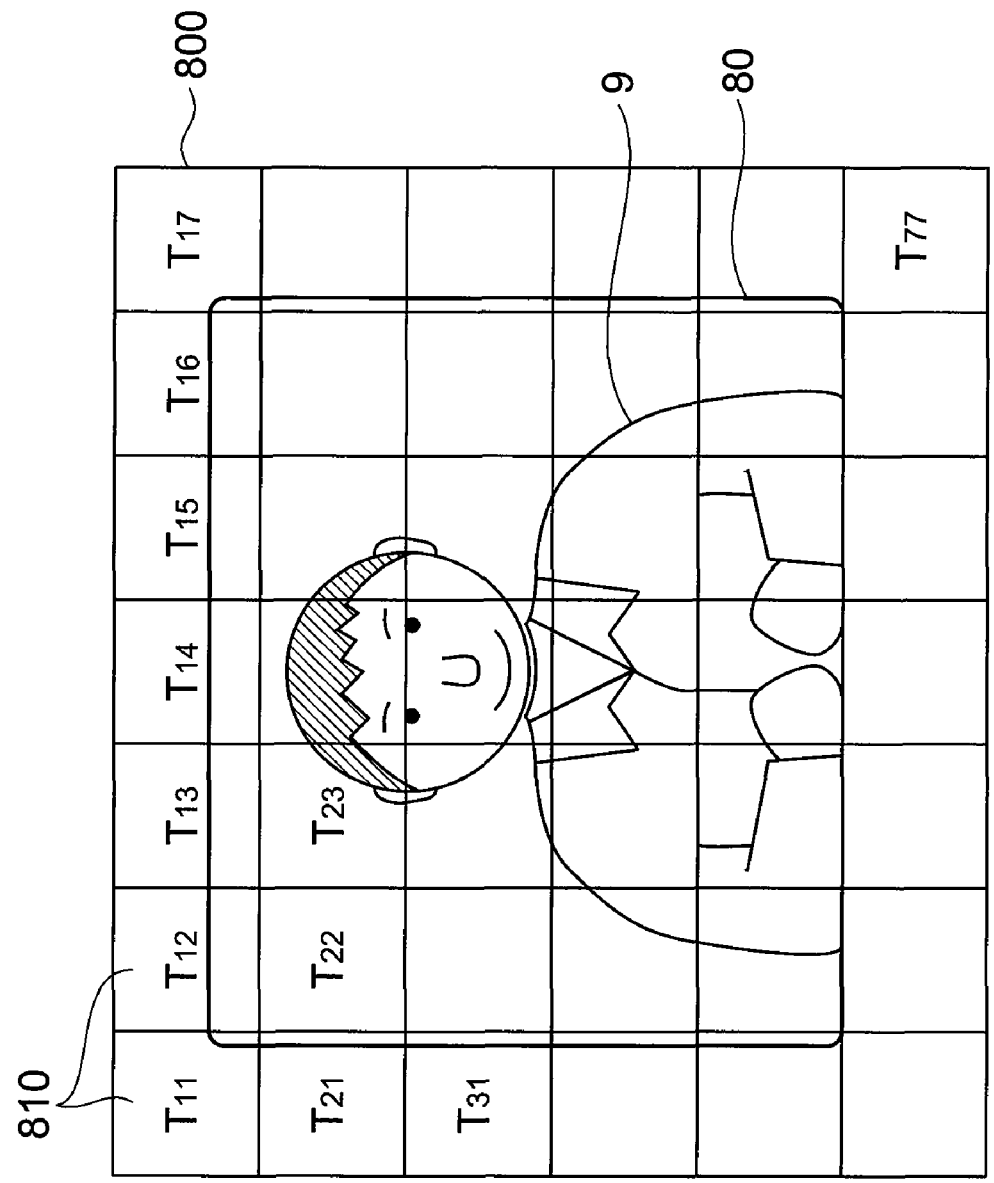
FIG. 8 is an illustration for explaining tiling.

This tiling at step ST201 is carried out as follows. As shown in FIG. 8, an image frame 800 including a monitor image 80 displaying an interlocutor image 9 is divided into tiles 810 ($T_{11}$-$T_{77}$) of the same size, and thereafter each of these tiles can be handled as one independent image. The size of tiles can be optionally selected by the interlocutor himself or herself; the minimum unit thereof is 1×1 pixel, and the maximum unit is $2^{32}-1 \times 2^{32}-1$ pixels. The size of the image frame 800 may be equal to that of the monitor image 80. However, the data size of the monitor image 80 is preferably as small as possible in order to effectively reduce the load on the controller (e.g., a CPU) executing the tiling. Then the tiling process may be carried out as follows: part of image data once taken with a wide-angle lens camera is tiled as a monitor image 80, and an enlargement of the monitor image 80 for processing is displayed on the occasion of display on the monitor screen 8.

Figure 9:
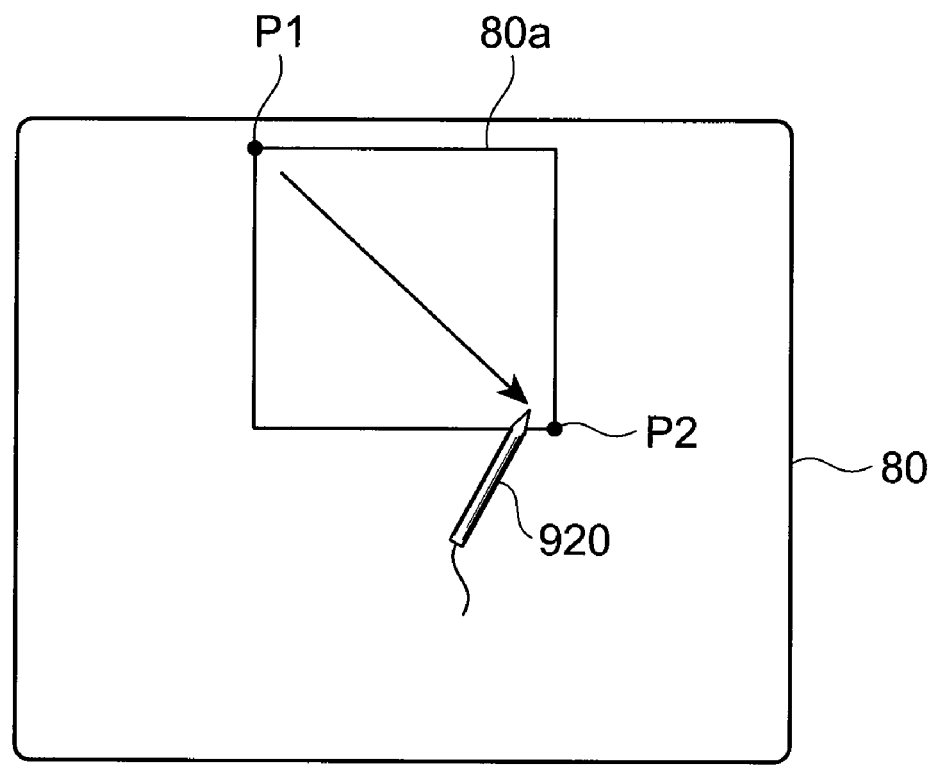
FIG. 9 is an illustration for explaining an example of a method of setting an ROI (region of interest)
Figure 10:
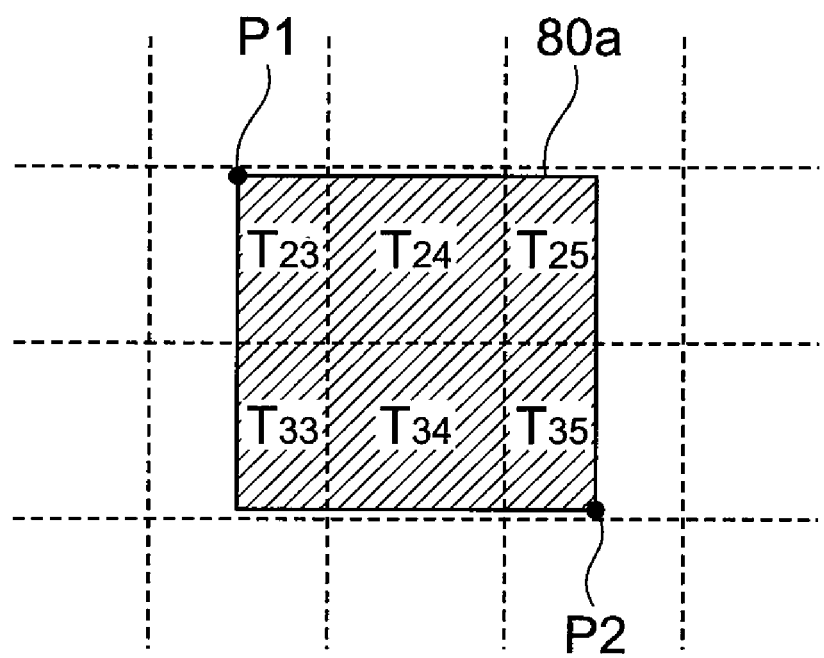
FIG. 10 is an illustration for explaining a correspondence relation between tiles and an ROI (No. 1)

The ROI in the image frame 800 is preferably set by the interlocutor himself or herself before a start of a dialogue while checking his or her own image on the monitor. Specifically, the ROI is set in such a manner that the interlocutor 3 himself or herself faces the monitor screen 8 of the display unit 21, as shown in FIG. 3, and sets the ROI with the touch pen 920. In this case, as shown in FIG. 9, an ROI 80a can be set as a rectangular region defined by a start point P1 and an end point P2 designated on the monitor screen 8 with touch pen 920. For example, supposing a rectangular region including the face of the interlocutor image 9 in the image frame 800 shown in FIG. 8 is set as the ROI 80a, tiles $T_{23}$, $T_{24}$, $T_{25}$, $T_{33}$, $T_{34}$, and $T_{35}$ among the tiles $T_{11}$-$T_{77}$ forming the image frame 800 are grouped into ROI 80a, as shown in FIG. 10. The ROI setting can also be carried out in such a manner that multiple ROIs are separately set in plural portions of one image frame 800, as described later. In this case, each of the multiple ROIs may be subject to change in the compression level and encryption level, whereby the interlocutor himself or herself can have the right of self-determination on the image quality, security, background image, and so on.

Figure 11:
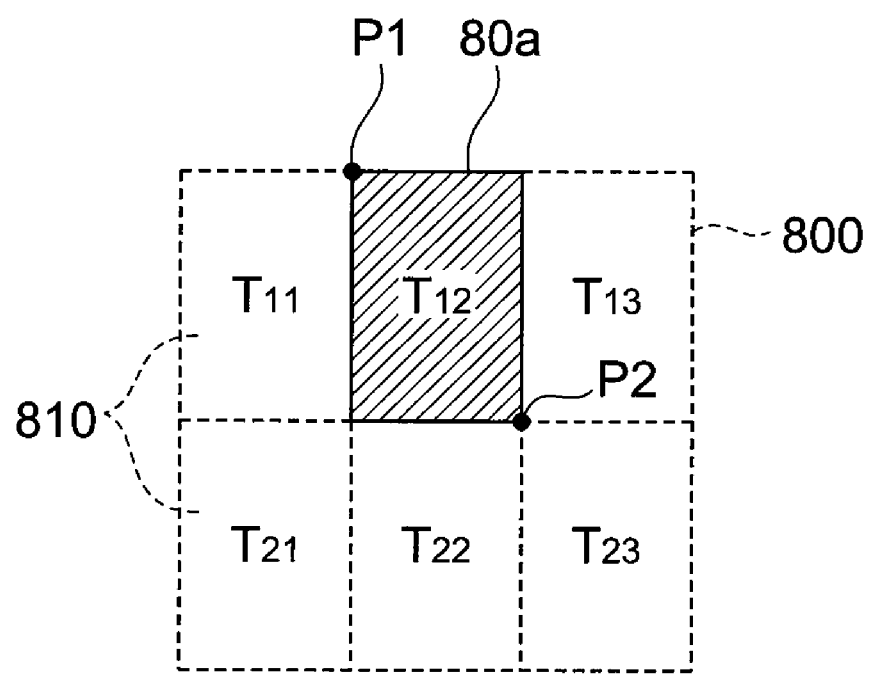
FIG. 11 is an illustration for explaining a correspondence relation between tiles and an ROI (No. 2)

The image frame 800 may be divided so that one tile $T_{12}$ agrees with ROI 80a, as shown in FIG. 11. In this case, the division number of the image frame 800 can be reduced.

Furthermore, the size of ROI 80*a* set at a start of a dialogue can vary during the dialogue (e.g., the interlocutor himself or herself can move). For this reason, by dynamically changing the division size of tiles 810 corresponding to the size variation of ROI 80*a*, it becomes feasible to achieve more efficient load sharing of image processing. In cases where ROI 80*a* is composed of multiple tiles 810, as shown in FIGS. 8 and 10, the tiles 810 associated with the ROI 80*a* can also be dynamically changed corresponding to the size variation of ROI 80*a*. The dynamic change during the dialogue embraces both the case where the interlocutor himself or herself manually changes the tile size according to circumstances, and the case where the controller or the like automatically changes the tile size while monitoring changes of circumstances.

The dynamic change of the tile size and the correspondence relations during the dialogue as described above is carried out because there are considerable differences among people, for example, as to the motion of hands, different from the motion of the eyes, mouth, and face. Namely, instead of always performing the fixed compression for hands at rest, the compression rate and division size are adaptively adjusted according to a person with considerable change in the motion of hands, a person with little change, or circumstances of the dialogue at that point, without use of the fixed compression rate and fixed division, and this enables better image processing.

Subsequent to the tiling (step ST201) as described above, the coding by the JP2 technology is then carried out for each of tiles 810 resulting from the division. In this embodiment, the coding is performed for only the tiles grouped into the ROI 80*a* at step ST201, and the code length is set to 0 for the tiles grouped into the non-ROI (the coding is not carried out). In this embodiment, where the coding is not carried out, an encoded string of some bytes indicating only existence of tile is assigned corresponding thereto, thereby avoiding failure of decoding.

The frame coding executed by the controller 263 is performed as follows for each of tiles: first, it is determined whether a tile as a processing target belongs to ROI 80*a* or not (step ST202), the coding is performed for only each tile belonging to ROI 80*a*, and no coding process is performed for each tile belonging to the non-ROI (the code length: 0).

When it is determined at step ST202 that a tile belongs to the ROI 80*a*, the discrete wavelet transform (DWT: step ST203), scalar-quantization (step ST204), and EBCOT (step ST205) are successively executed as coding processes.

Here the discrete wavelet transform (DWT) at step ST203 is a process of dividing a tile image into subbands. The JP2 technology adopts DWT based on the lifting scheme of 2-channel filter bank. The DWT based on the lifting scheme is classified under two types: integer DWT as a reversible transform; real number DWT being an irreversible transform. The real number DWT is used for lossy (irreversible) coding, and the integer DWT for lossless (reversible) coding.

The scalar quantization at step ST204 is to scalar quantize DWT coefficients in each subband. However, this process is omitted in use of the integer DWT. The quantization step size for this scalar quantization is expressed as follows.

$$\Delta_b = 2^{R_b - E_b}\{1 + (\mu_b/2^{11})\}$$

In this expression, $\Delta_b$ represents the quantization step of subband b, and $R_b$ the dynamic range of subband b. $E_b$ and $\mu_b$ are parameters expressed by 5 bits and 11 bits, respectively, and are fed for dequantization, to a decoder. The quantization step size is set as follows: a small step size for each tile with a high priority level of image quality, i.e., a tile expected to have a high image quality; a large step size for each tile belonging to the non-ROI permitting a low image quality. The quantization step size of 1 is substantially equivalent to not performing this scalar quantization.

Next, the EBCOT (Embedded Block Coding with Optimized Truncation) at step ST205 is an algorithm in charge of the processing corresponding to the entropy coding and rate control, and is composed of three steps of coefficient bit modeling, arithmetic coding, and layer division-code truncation. In this EBCOT, there are coding units called code-blocks. The code-blocks are defined by rectangular regions in the DWT region, and have the same size in all the subbands. The steps except for the arithmetic coding among the above three steps are independently carried out in units of the code-block size.

In the coefficient bit modeling, coefficients in each code-block are decomposed into bit-planes, and context information (context) of coefficient bits in each bit-plane is judged. In the context judgment, Context Assignment Map based on a statistical model prepared in advance is prepared. Context Assignment Map differs among subbands. According to the context information of coefficient bits, one bit-plane is decomposed and arranged into three coding passes (sub-bit-planes).

Next, the arithmetic coding is to code each coding pass by use of an MQ coder being a binary arithmetic coder. The MQ coder necessitates the context information for coding, and for that, the context information obtained by the coefficient bit modeling is used.

In the layer formation and code truncation, a coded data string generated for each code-block is divided into a plurality of SNR layers within a given coding rate in accordance with a level of contribution to improvement in SNR in a reproduced image frame. The highest layer has the greatest influence on the image quality, and the image quality of the reproduced image frame can be improved stepwise by receiving the layers in order from the highest to the lowest. A position permitting division into layers is limited to an end of each coding pass, and this end point is called a truncation point. The rate control in JP2 is achieved by arranging data in an order of contribution to image quality from the highest and discarding data over a given coding rate in units of truncation points.

When the coding (steps ST203-ST205) or a skip of the coding completes for all the tiles forming one image frame as described above (step ST206), coded data of tiles thus obtained are combined to generate coded data of one image frame (step ST207).

Figure 12:
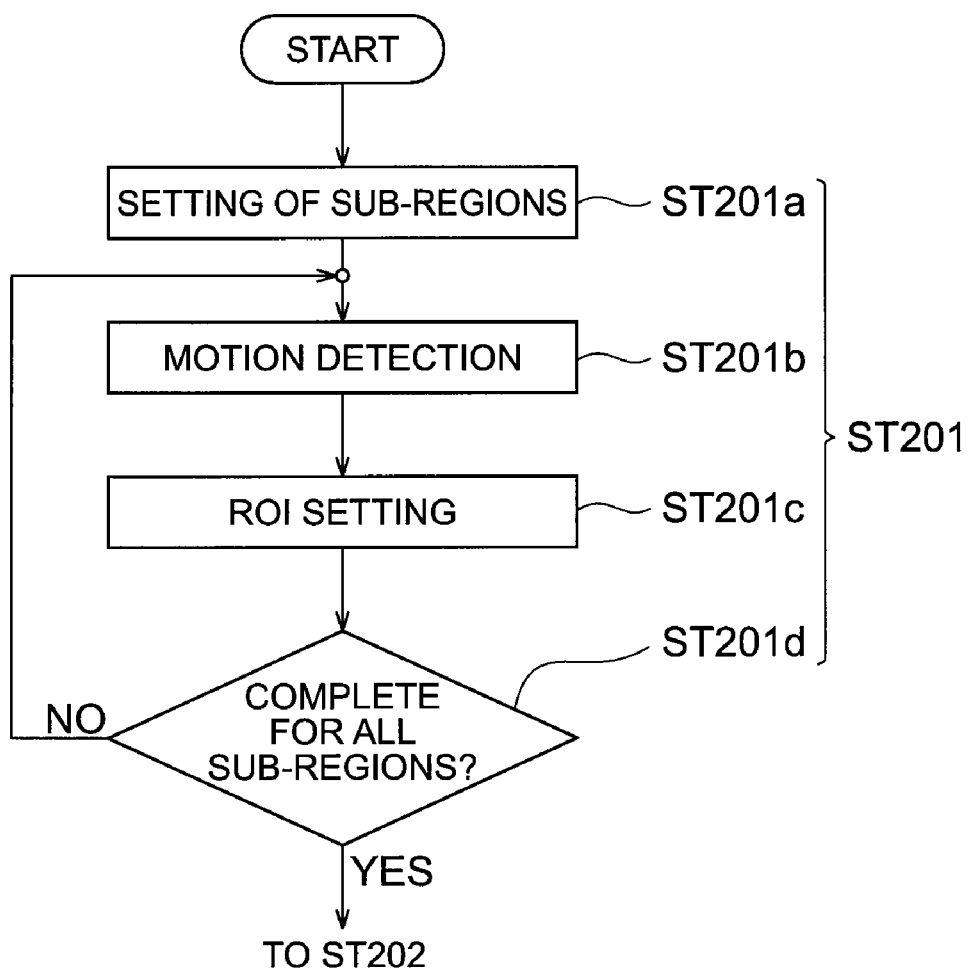
FIG. 12 is a chart for explaining another example of a method of setting an ROI (region of interest)

Step ST201 described above was to associate each tile in the predetermined size with the ROI or the non-ROI by making use of the ROI information set by the interlocutor himself or herself at the preprocessing step (step ST10), but this ROI setting may also be arranged to automatically associate each tile in which a motion of an image is detected, among the separate tiles, with the ROI. FIG. 12 is an illustration showing another example of the ROI setting method.

The first step is to divide an image frame into tiles of a predetermined size as sub-regions (step ST201*a*). The next step is to perform motion detection of an image for each of the separate tiles (step ST201*b*), and each tile with actual image motion detected is set to the ROI (step ST201*c*). After the above processes are carried out for all the tiles (step ST201*d*), the subsequent step ST202 is executed.

Figure 13A:
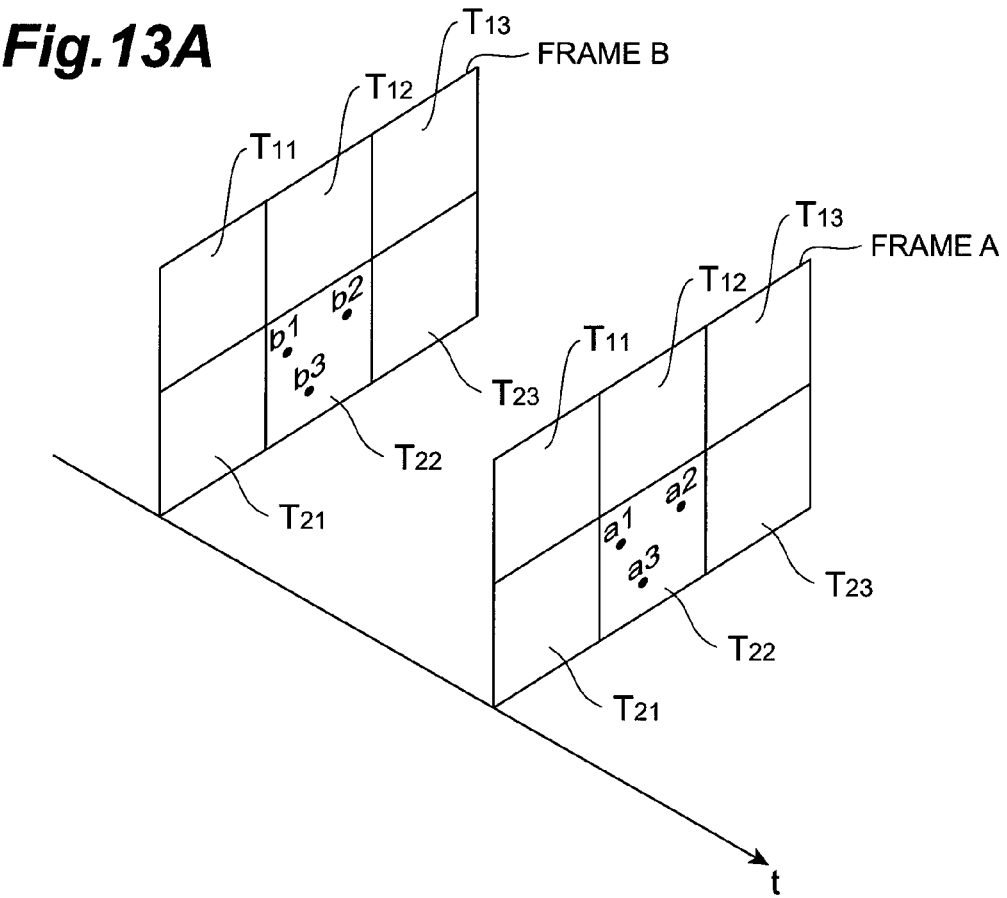
FIGS. 13A and 13B are illustrations for explaining detection of motion of an image in each tile.
Figure 13B:
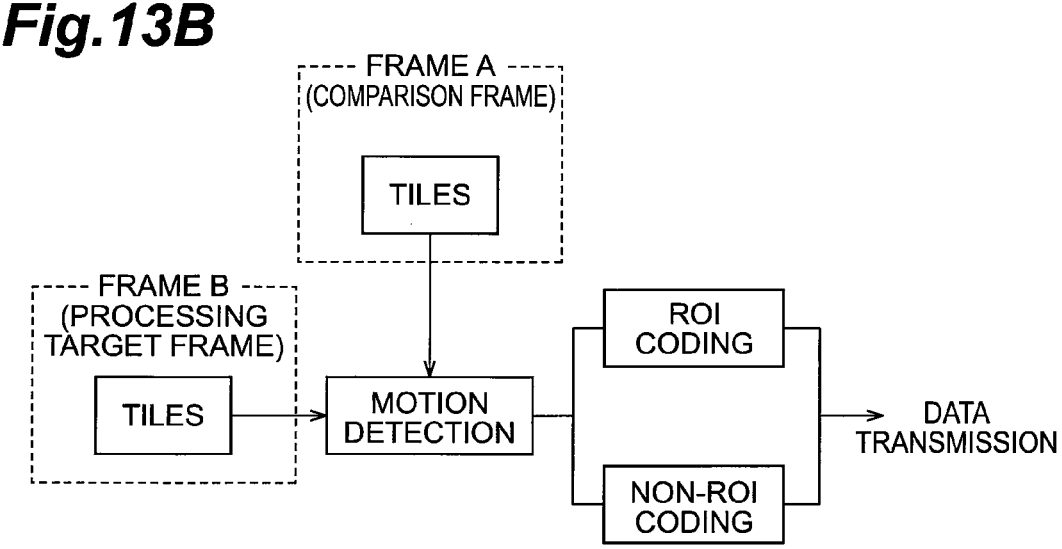

FIGS. 13A and 13B are illustrations for explaining the motion detection operation in each of the separate tiles. FIG. 13A shows a state in which a comparison is made between a tile $T_{22}$ in a preceding image frame A (composed of tiles $T_{11}$-$T_{23}$) and a corresponding tile $T_{22}$ in a subsequent image frame B (composed of tiles $T_{11}$-$T_{23}$). A specific comparison is made by determining luminance values a1, a2, a3 of pixels preliminarily designated in the tile $T_{22}$ in the preceding image frame A and luminance values b1, b2, b3 of corresponding pixels in the tile $T_{22}$ in the subsequent image frame B and summing up differences thereof between these corresponding pixels to obtain an amount of motion. Namely, the amount of motion of the tile $T_{22}$ is expressed by the expression below.

$$(a1-b1)+(a2-b2)+(a3-b3)$$

If the amount of motion calculated according to the above expression exceeds a predetermined threshold, the tile $T_{22}$ is set to the ROI. The number of pixels used for the comparison of luminance values may differ among tiles.

FIG. 13B is a block diagram conceptually showing the coding process including the above motion detection operation. As shown in this FIG. 13B, the motion detection is carried out for each of tiles in the subsequent image frame B as a processing target by making use of the corresponding tiles in the preceding image frame A being a comparison target, and, based on the result of this detection, each tile is coded as an ROI or as a non-ROI (in the case of the non-ROI, the code length may be 0), to obtain the coded data of the subsequent image frame B.

Next, FIG. 14 is an illustration for conceptually explaining the transmission/reception operation of motion-image data in the two-way interactive system to which the coding method for motion-image data as described above is applied (the two-way interactive system according to the present invention). The description below concerns an example of tiling in which a monitor image 80 displaying an interlocutor image taken from the CCD camera 5 is divided into six tiles.

In the transmitter terminal equipment 20A, first, each of image frames (monitor image 80 displaying the interlocutor image) sequentially taken from the CCD camera 5 is tiled into six tiles ($T_{11}$-$T_{23}$), and for each image frame, the tile $T_{12}$ grouped into ROI 80a is coded. On the other hand, the tiles $T_{11}$, $T_{13}$, and $T_{21}$-$T_{23}$ grouped into the non-ROI are coded at intervals of a fixed period. While the transmitter terminal equipment 20A sends the coded data of image frames (including only codes of compressed tile $T_{12}$) at 30 frames/sec (fps) onto a transmission line, for example, of a transmission rate of 10 Mbps, it also sends coded data including compressed data of all the tiles $T_{11}$-$T_{23}$ at intervals of the fixed period. By preliminarily grouping the tiles forming one image frame into the object to be coded and the object not to be coded, as described above, the load of image processing is reduced on the transmitter terminal equipment 20A.

On the other hand, the receiver terminal equipment 20B decodes the coded data sequentially received at 30 fps. On this occasion, during the fixed period, it obtains decoded data of the tile $T_{12}$ associated with the ROI 80a, but obtains no decoded data of the tiles $T_{11}$, $T_{13}$, and $T_{21}$-$T_{23}$ associated with the non-ROI (the code length fed from the transmitter terminal equipment 20A is 0). In this case, the receiver terminal equipment 20B combines the decoded tile image with tile images corresponding to the tiles $T_{11}$, $T_{13}$, and $T_{21}$-$T_{23}$ of another image date previously received and decoded, to generate an image frame 90 to be newly displayed.

In the special dialogue environment wherein motion-image data with information concentrated in only a partial region of the displayed image is transmitted as in the two-way interactive system for implementing the real-time two-way interaction, as described above, the plurality of tiles obtained from each image frame are grouped into either of the ROI and the non-ROI, and coding of each image frame is performed using different compression levels for each tile grouped into the ROI and for each tile grouped into the non-ROI, thereby enabling reduction of load and increase of speed of the coding process for motion-image data in the two-way interactive system.

Figure 15:
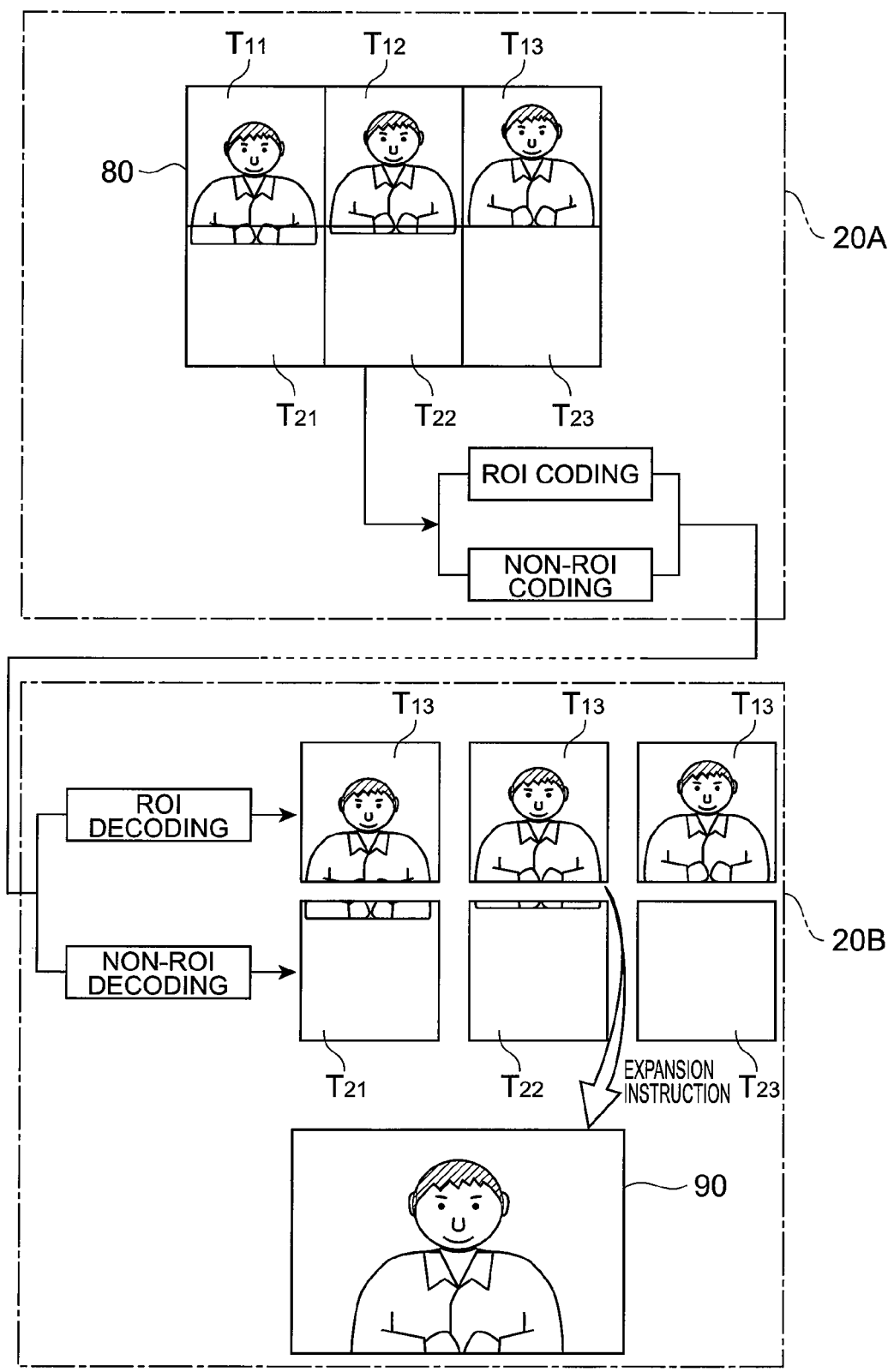
FIG. 15 is an illustration for conceptually explaining another example of the transmission/reception operation of motion-image data in a two-way interactive system according to the present invention.

The above reception operation involves generating the image frame 90 for display by combining all the decoded tiles or by combining a decoded tile with tiles stored as tiles of a preceding image frame, but the generation of the image frame for display is not limited to this method. FIG. 15 is an illustration for conceptually explaining another example of the transmission/reception operation of motion-image data in the two-way interactive system according to the present invention.

In the transmission operation, similar to the operation shown in FIG. 14, the transmitter terminal equipment 20A executes either of the ROI coding and non-ROI coding for each of tiles $T_{11}$-$T_{23}$ and transmits resultant coded data to the receiver terminal equipment 20B. The receiver terminal equipment 20B decodes coded data of each tile associated with the ROI, and also decodes coded data of each tile associated with the non-ROI. Then the receiver terminal equipment enlarges only a necessary tile $T_{12}$ to generate an image frame 90 for display.

In the example shown in this FIG. 15, a plurality of tiles are set in the ROI, but the ROI may be set while dynamically changing one tile displaying a display target person, corresponding to a progress of a conference. In this case, only the tile to be displayed as enlarged is preliminarily coded and transmitted, so that the processing load is reduced more.

For example, let us suppose a video conference in which a plurality of attendants participate. The transmitter terminal equipment 20A preliminarily allocates tiles for displaying the respective attendants, and, where one of the attendants raises a hand, the transmitter terminal equipment sets the tile with the motion of image detected, to the ROI, and performs the ROI coding or the non-ROI coding for each tile. On the other hand, the receiver terminal equipment 20B may perform the enlarging process of only the tile associated with the ROI among the decoded tiles, as an image frame 90 for display.

Figure 16:
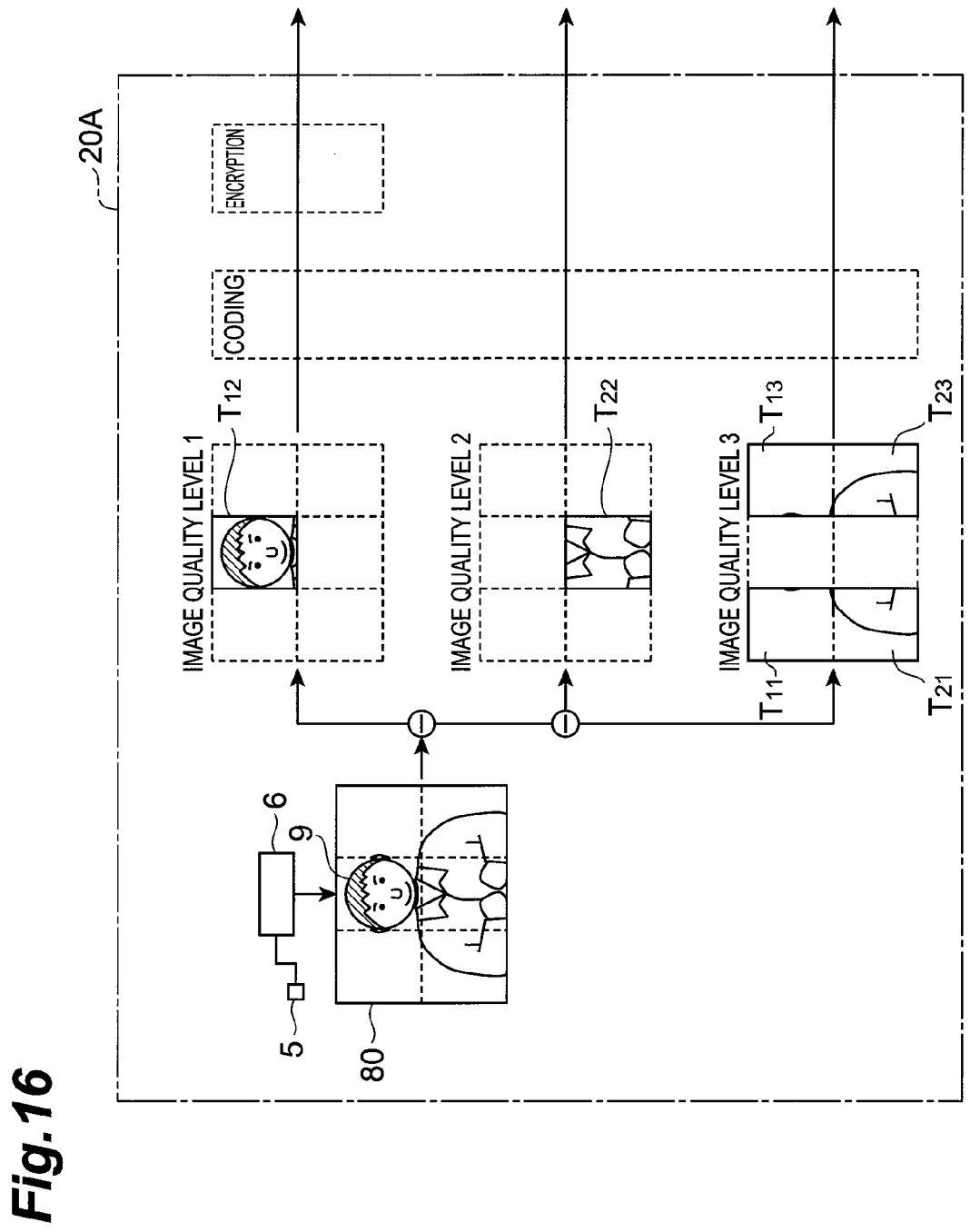
FIG. 16 is an illustration for conceptually explaining a first application example of frame coding in the transmission/reception operation of motion-image data shown in FIGS. 14 and 15.

In the foregoing example shown in FIG. 14 each image frame was tiled into six tiles, and each of the separate tiles $T_{11}$-$T_{23}$ was grouped into either of the ROI and the non-ROI. This ROI may be further divided into a plurality of regions with different required quality levels. FIG. 16 is an illustration for conceptually explaining a first application example (particularly, transmission operation) of the transmission/reception operation of motion-image data shown in FIG. 14.

Concerning the expressions of the interactive partner, the finest and fastest display is demanded for delicate changes of the eye lines, the eyes, and the eyebrows, while, as to the motion of hands being a nonverbal expression, it is important to display the motion of hands and movement of the outlines with quick response. At that time the quality of the hands themselves may undergo degradation, with little influence on the essence of the dialogue. With consideration to the dialogue environment specific to the two-way interactive system, therefore, FIG. 16 shows the operation in which the transmitter terminal equipment 20A groups a tile $T_{12}$ into a high-resolution and high-speed display region (first ROI) including the face and head in high resolution and at high speed during the dialogue, groups a tile $T_{22}$ into a middle-resolution and high-speed display region (second ROI) including the hands, arms, and breast, and groups the rest tiles $T_{11}$, $T_{13}$, $T_{21}$, and $T_{23}$ into a non-ROI. It is more effective in realizing the smooth two-way interaction in a reduced state of the image processing load, to group the interior of the image frame into plural types of regions with compression levels varying stepwise, in consideration of degrees of influence on the dialogue as described above.

With consideration to the degree of influence of each region in the image frame on the dialogue, the code length of the tiles $T_{11}$, $T_{13}$, $T_{21}$, and $T_{23}$ grouped into the non-ROI may be set at 0 during a certain period of time. Specifically, the non-ROI is not coded, and an encoded string of some bytes indicating only the existence of the non-coded tile is set to avoid failure of decoding.

Furthermore, if the tile $T_{12}$ grouped into the ROI is encrypted, the privacy of the interlocutor using the two-way interactive system can be protected. It is because the two-way interactive system realizing the eye contact state between interlocutors as described above is promising in application to therapy systems such as counseling for people with aftereffects due to disasters or accidents, as well as the video conferencing systems merely used in business scenes. On the other hand, since the two-way interaction requires real-time encryption and decryption, the encryption of only the important region in the interaction enables more efficient image processing. The important region in the interaction (ROI) is mainly the face of the partner image. Unless this part is discriminated, it is very difficult to specify each individual. Therefore, the privacy of the interlocutor can be well protected by selectively encrypting only the ROI being the high-resolution (low compression rate) and high-speed display region. Voice is also important for specifying each individual, and encryption thereof independent of the image enables construction of stronger security.

Furthermore, the two-way interaction is carried out as the interlocutor is looking at the face of the partner (while an eye contactable state is kept), but the interaction only through the image of the partner is not so realistic as real face-to-face dialogues (visual dialogues making use of motion-images or document images). As a realistic interactive environment, the two-way interaction also requires diverse images like smooth dialogues using documents and like display of the upper half of the body and the entire room as well as the face, as in the case of the face-to-face dialogues. Therefore, an ideal configuration is such that a realistic dialogue is achieved with flexible display of documents such as texts in combination with the display of the partner image. However, a large circuit capacity is necessary for additional transmission of still images or motion-images from such information sources, and it can be hindrance to spread of the interactive system.

Such realistic two-way interactions also include remote practical teaching of musics, dramas, various hobbies, the whole range of qualifications, and so on, and, particularly, in such dialogue environments, it is preferable to combine images observed from multiple view points and to display a text corresponding to a picture at that point as occasion may demand. Furthermore, not only in the case of the remote practical teaching, but also in the case of on-site teaching, it is also preferable to combine observation images from multiple view points and to record display of a text and to perform teaching through observation of a reproduced image.

Figure 17:
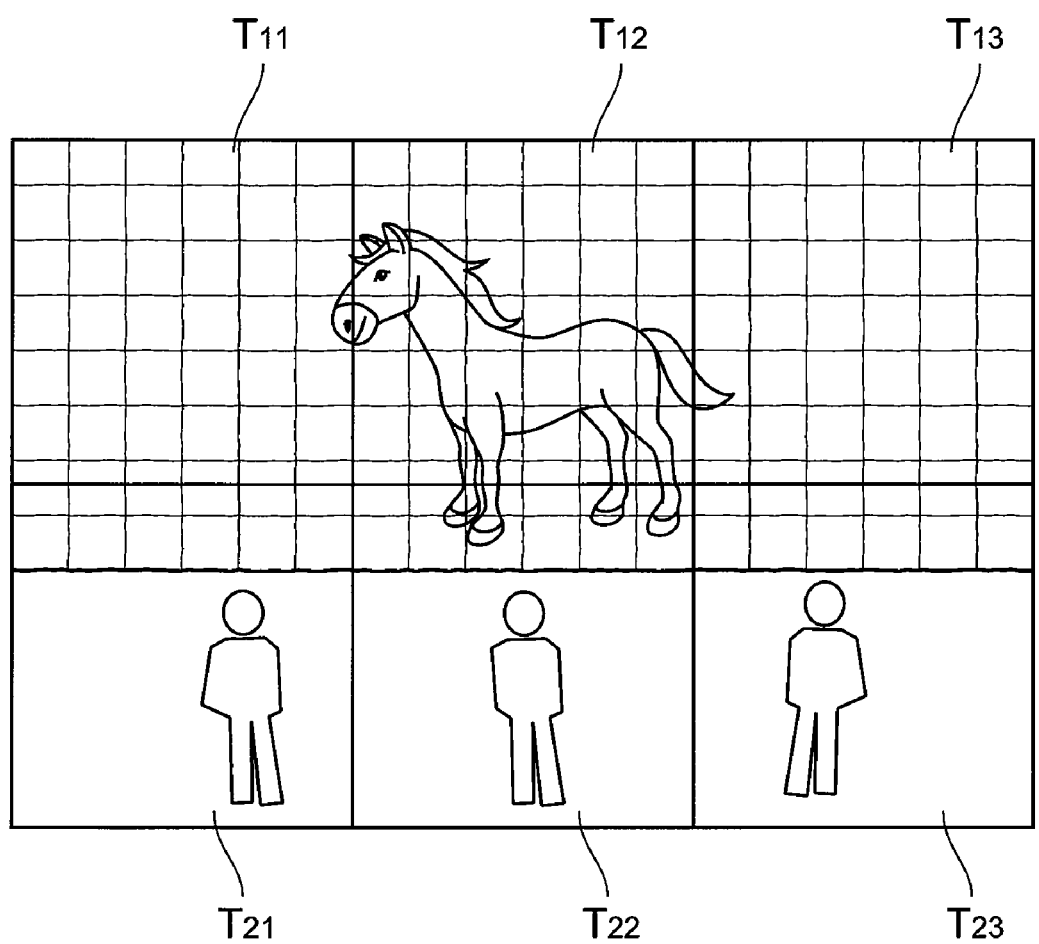
FIG. 17 is an illustration for conceptually explaining a specific example of the first application example shown in FIG. 16.

FIG. 17 is an illustration for conceptually explaining a specific example of the foregoing first application example shown in FIG. 16. This FIG. 17 shows an image frame displayed on a surveillance monitor at a zoo. For this image frame, the presence/absence of encryption is determined based on detection of motion of an image in each tile, or the presence/absence of encryption and the strength thereof are preliminarily set for each of tiles. In this application example, only the tiles set as the ROI are not encrypted, but any tile is set as a tile to be encrypted.

Namely, tiles $T_{11}$, $T_{12}$, and $T_{13}$ displaying an animal in a cage are not encrypted and coded data thereof is transmitted only when the animal moves. On the other hand, tiles $T_{21}$, $T_{22}$, and $T_{23}$ displaying people in front of the cage are encrypted at a low level in view of protection of privacy.

The motion-image data to be coded can be document data generated by application software such as PowerPoint, spreadsheet software, word-processing software, and browsing software, and the coding operation thereof will be described below with reference to FIGS. 18 and 19A-19C. FIGS. 18 and 19A-19C all are drawings for conceptually explaining a second application example of the frame coding in the transmission/reception operation of motion-image data shown in FIG. 14. A data file generated by the foregoing application software is once transformed into image data and thereafter is subjected to such processing as compression.

The display data or the like generated by the foregoing application software is frequently subject to a local change with passage of time (e.g., movement of a cursor, additional display of characters, etc.), and, therefore, it can also be handled as motion-image data as a whole by defining display data at each interval of a fixed period as one image frame. For this reason, the motion-image data in the present specification embraces the display data generated by the foregoing application software or the like, a combination of a still image with a video, etc., in addition to the video data taken by the imaging device or the like.

Figure 18:
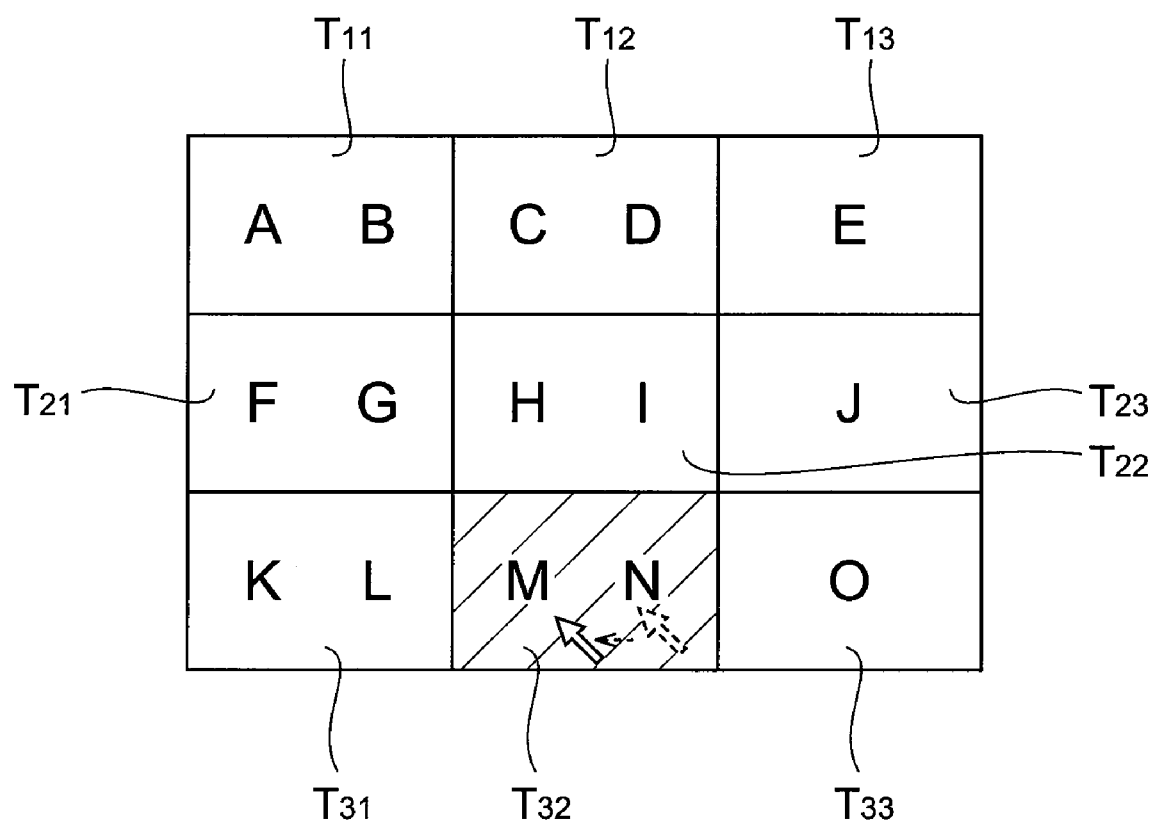
FIG. 18 is an illustration for conceptually explaining a second application example of frame coding in the transmission/reception operation of motion-image data shown in FIG. 14.

First, in the example shown in FIG. 18, tiling is performed for an image frame such as a text or a photograph (which may be a video). At this time, movement of a pointer is detected and a tile $T_{22}$ where the pointer is present is coded.

Figure 19A:
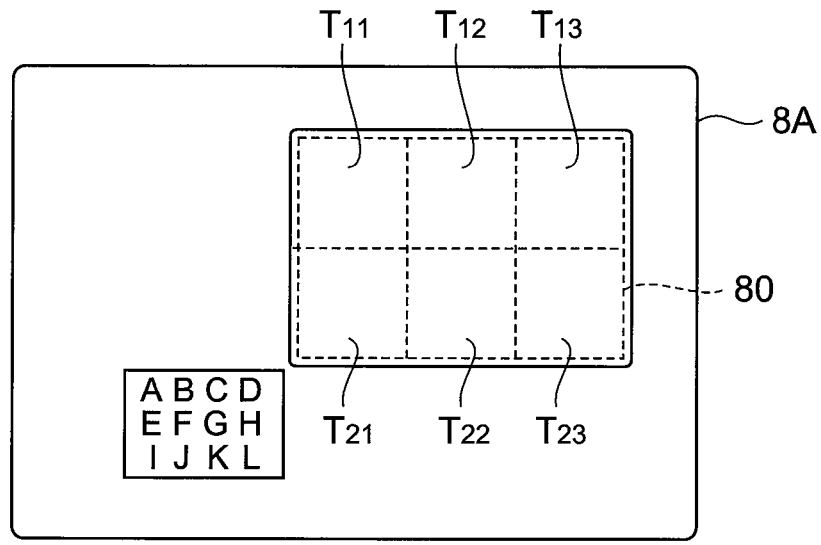
FIGS. 19A to 19C are illustrations for conceptually explaining a second application example of frame coding in the transmission/reception operation of motion-image data shown in FIG. 14.
Figure 19B:
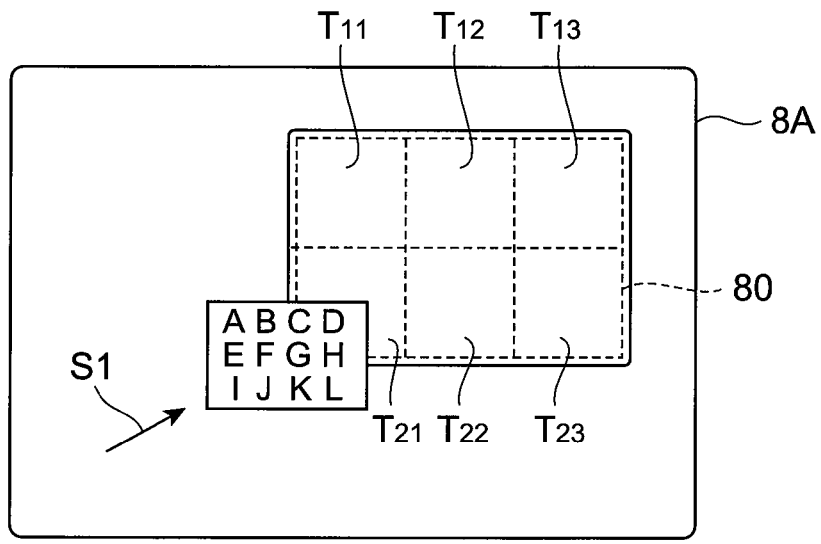
Figure 19C:
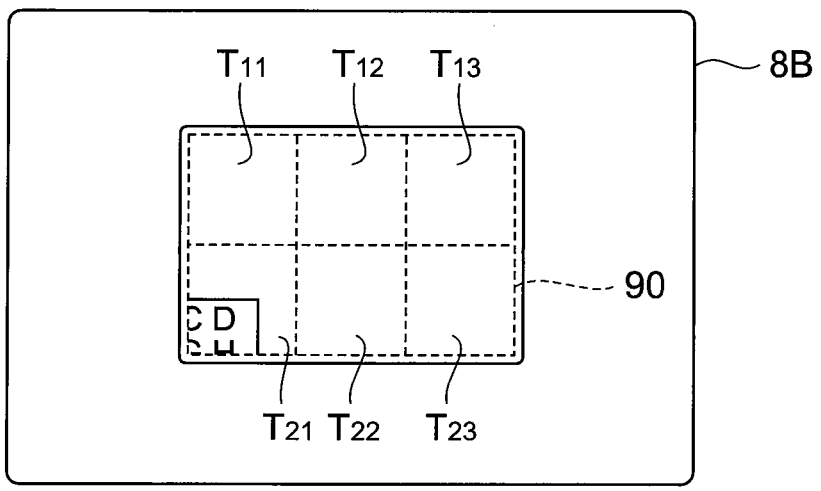

On the other hand, in the example of FIGS. 19A-19C, a transmission image region (which is tiled as a transmission image frame 80) is set in a monitor screen 8A in the transmitter terminal equipment, as shown in FIG. 19A, and document data generated by application software such as Power-Point, spreadsheet software, word-processing software, or browsing software is displayed outside the transmission image region.

When the document data is dragged in the direction indicated by arrow S1 on the monitor screen 8A and part thereof moves into the transmission image region, as shown in FIG. 19B, the transmitter terminal equipment can detect the occurrence of the motion of the image in tile $T_{21}$. Therefore, the transmitter terminal equipment codes the tile $T_{21}$ and transmits coded data to the receiver terminal equipment.

The receiver terminal equipment displays an image frame 90 in which only decoded tile $T_{21}$ is newly combined, on the monitor screen 8B, as shown in FIG. 19C.

Furthermore, a third application example of the coding method for motion-image data according to the present invention is configured to embed an image obtained from an information source different from the motion-image data being an object to be transmitted (a part of a still image not causing any trouble in a dialogue even at a low compression level, or a part of an image frame forming another motion image), in a part of an image frame to be coded, e.g., a rectangular region corresponding to the non-ROI. This configuration enables a more realistic two-way interaction, without restrictions on the current communication environments such as the throughput and the image processing capability. The third application example of the coding method for motion-image data according to the present invention will be described below in detail with reference to FIGS. 20-23.

Figure 20:
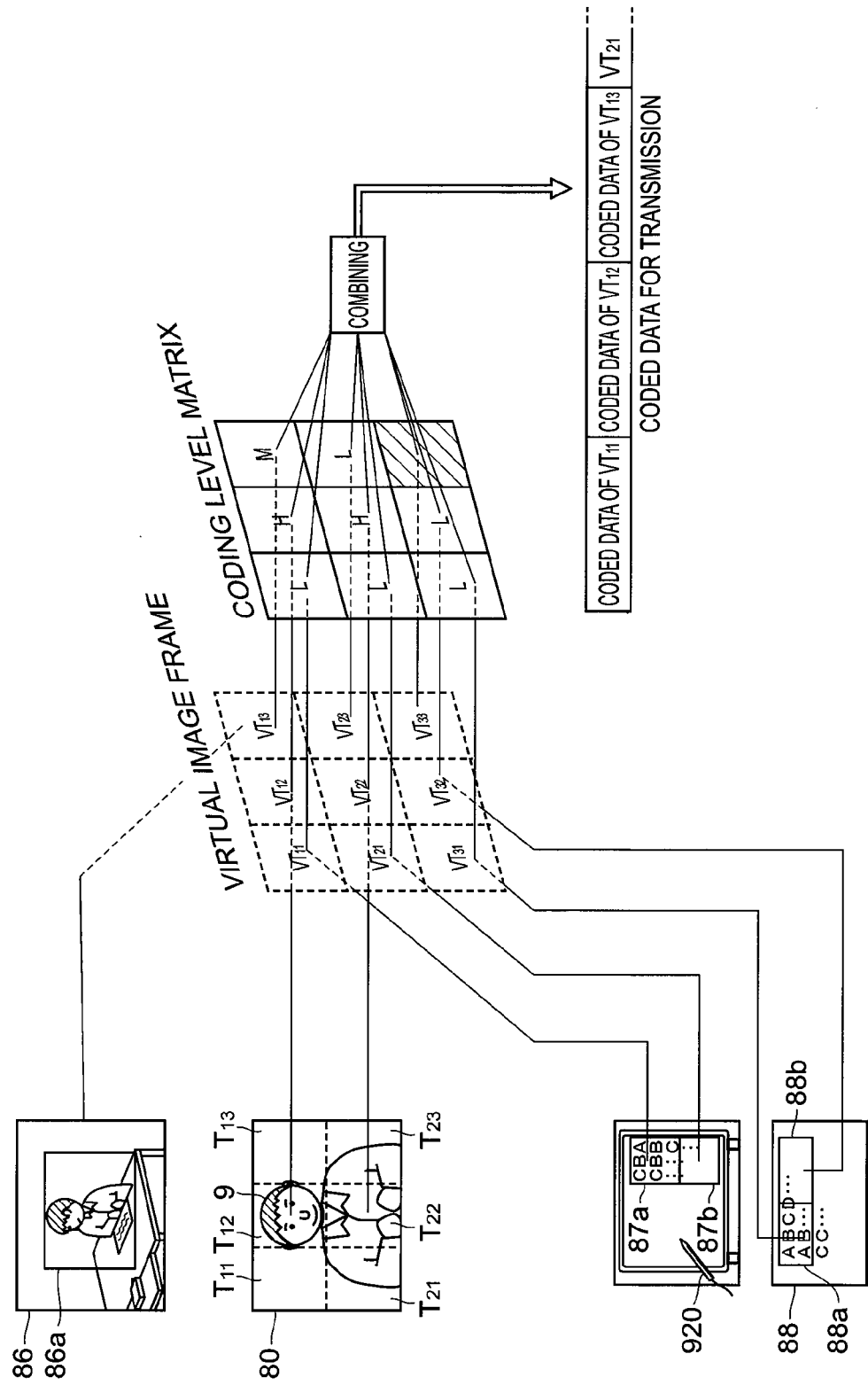
FIG. 20 is an illustration for conceptually explaining a third application example of frame coding in the transmission/reception operation of motion-image data according to the present invention.

FIG. 20 is an illustration for conceptually explaining the third application example (particularly, transmission operation) of the frame coding in the transmission/reception operation of motion-image data according to the present invention.

In this third application example, a virtual image frame composed of a plurality of sub-regions $VT_{11}$-$VT_{33}$ is set as an image frame 80 to be coded, and these sub-regions $VT_{11}$-$VT_{33}$ are handled as tiles being processing units in the tiling of JP2. The image frame 80 is divided into 3×3 regions, while the virtual image frame is divided into 4×4 regions (the division size of which is the same as the rectangular regions $T_{11}$-$T_{23}$ in the image frame 80).

Then the rectangular regions $T_{12}$, $T_{22}$ set in the ROI of the image frame 80 out of the sub-regions forming the virtual image frame are allocated to the sub-regions $VT_{12}$, $VT_{22}$ of the virtual image frame. A part 86a of a motion-image frame 86 showing the entire image of the interlocutor is allocated to the sub-region $V_{13}$ of the virtual image frame. Portions 88a, 88b of a text image 88 indicating character information entered through a keyboard are allocated to the sub-regions $VT_{31}$, $VT_{32}$ of the virtual image frame. Portions 87a, 87b of a whiteboard image 87 indicating hand written character information entered through light pen 920 or the like are allocated to the sub-regions $VT_{11}$, $VT_{21}$ of the virtual image frame. It is assumed that no image is allocated to the sub-region $VT_{33}$ of the virtual image frame.

Coding levels are preliminarily designated, as shown in the coding level matrix of FIG. 20, for the respective images of plural types allocated to the sub-regions $VT_{11}$-$VT_{33}$ as described above. "H" means a high compression rate instruction, "M" a middle compression rate instruction, and "L" a low compression rate instruction. The hatched region in the coding level matrix is a region indicating a coding level for the sub-region $VT_{33}$ of the virtual image frame, but no image is allocated to the sub-region $VT_{33}$; therefore, this region is not coded (the code length=0). Each of the sub-regions $VT_{11}$-$VT_{33}$ is individually compressed by the JP2 technology in accordance with the coding level designated by this coding level matrix, and the resultant coded data of the sub-regions $VT_{11}$-$VT_{33}$ is combined to generate coded data of each virtual image frame.

Virtual image frames set as image frames of motion-image data being an object to be coded are successively coded along the time axis as described above, thereby sequentially obtaining coded data for reproduction of the motion image consisting of a mixture of still images with one image frame of the motion image.

Figure 21:
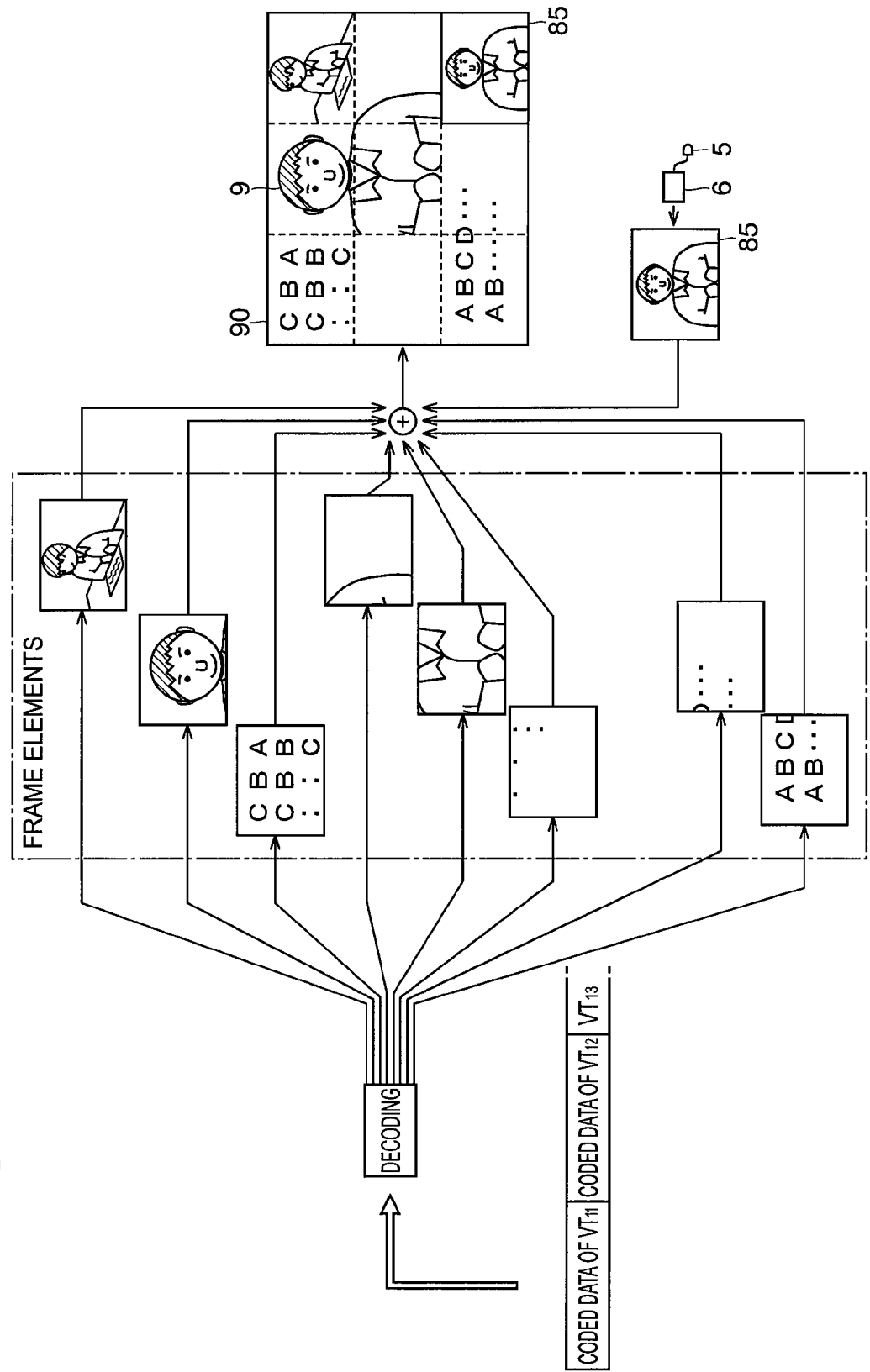
FIG. 21 is an illustration for conceptually explaining a decoding operation of coded data obtained by the frame coding according to the third application example shown in FIG. 20.

On the other hand, FIG. 21 is an illustration for conceptually explaining the decoding operation of coded data obtained by the frame coding according to the third application example shown in FIG. 20.

Since the coded data transmitted through predetermined transmission means 27 is composed of the coded data of sub-regions $VT_{11}$-$VT_{33}$ of the virtual image frame as shown in FIG. 20, the images allocated to the sub-regions $VT_{11}$-$VT_{33}$ are obtained as frame elements by decoding each of the coded data of these sub-regions $VT_{11}$-$VT_{33}$. Since the code length of the sub-region $VT_{33}$ of the virtual image frame is 0, a personal image 85 of the interlocutor himself or herself is prepared as a frame element corresponding to this sub-region $VT_{33}$.

A display image frame 90 as shown in FIG. 21 is obtained by combining the frame elements decoded as described above, with the personal image of the interlocutor himself or herself separately prepared. As coded data transmitted from the partner terminal equipment is sequentially decoded along the time axis, the receiver terminal equipment sequentially obtains image frames for reproduction of the motion image consisting of a mixture of still images with one image frame of the motion image.

Figure 22:
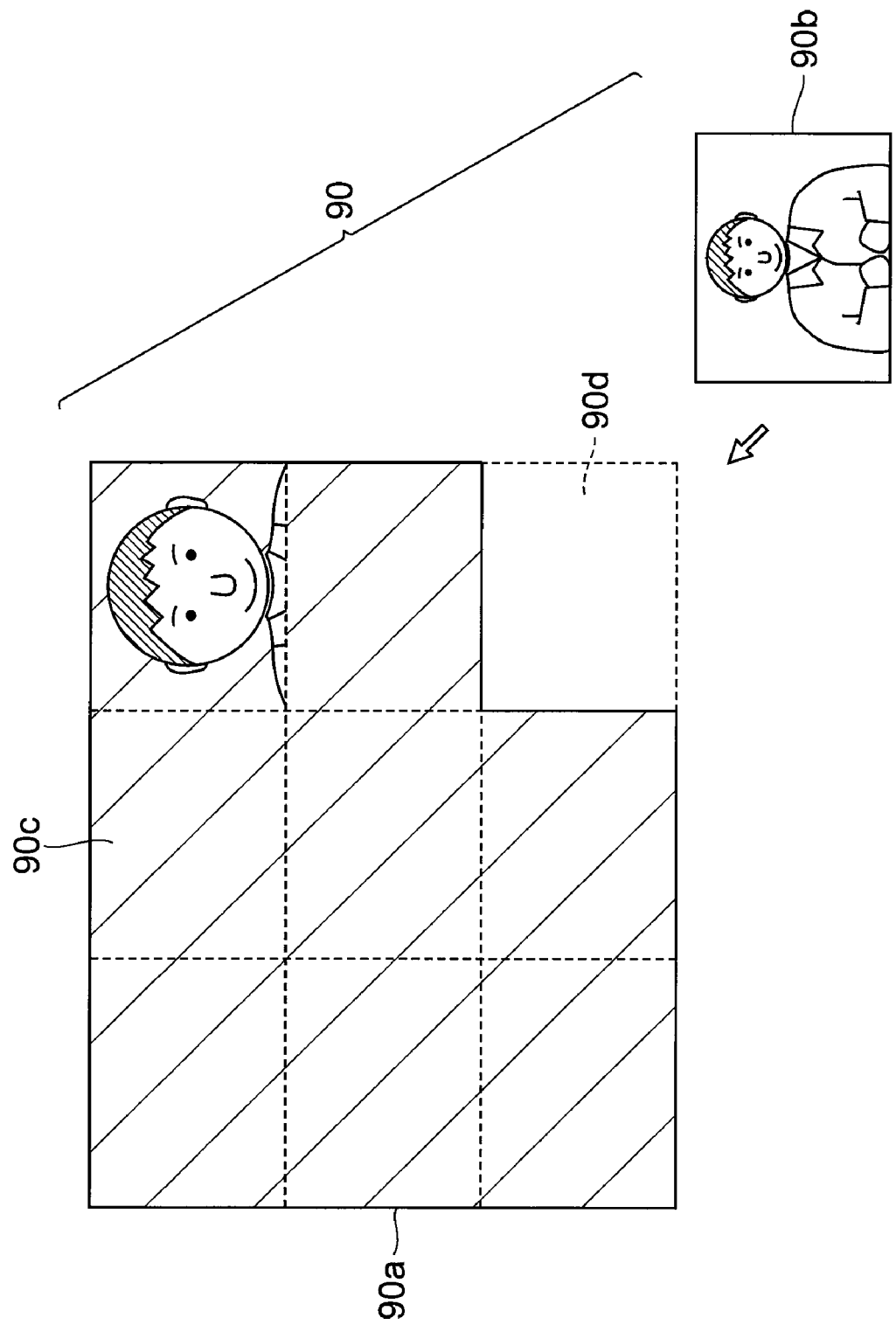
FIG. 22 is an illustration showing an example of an image frame for display in application of the frame coding according to the third application example shown in FIGS. 20 and 21.
Figure 23:
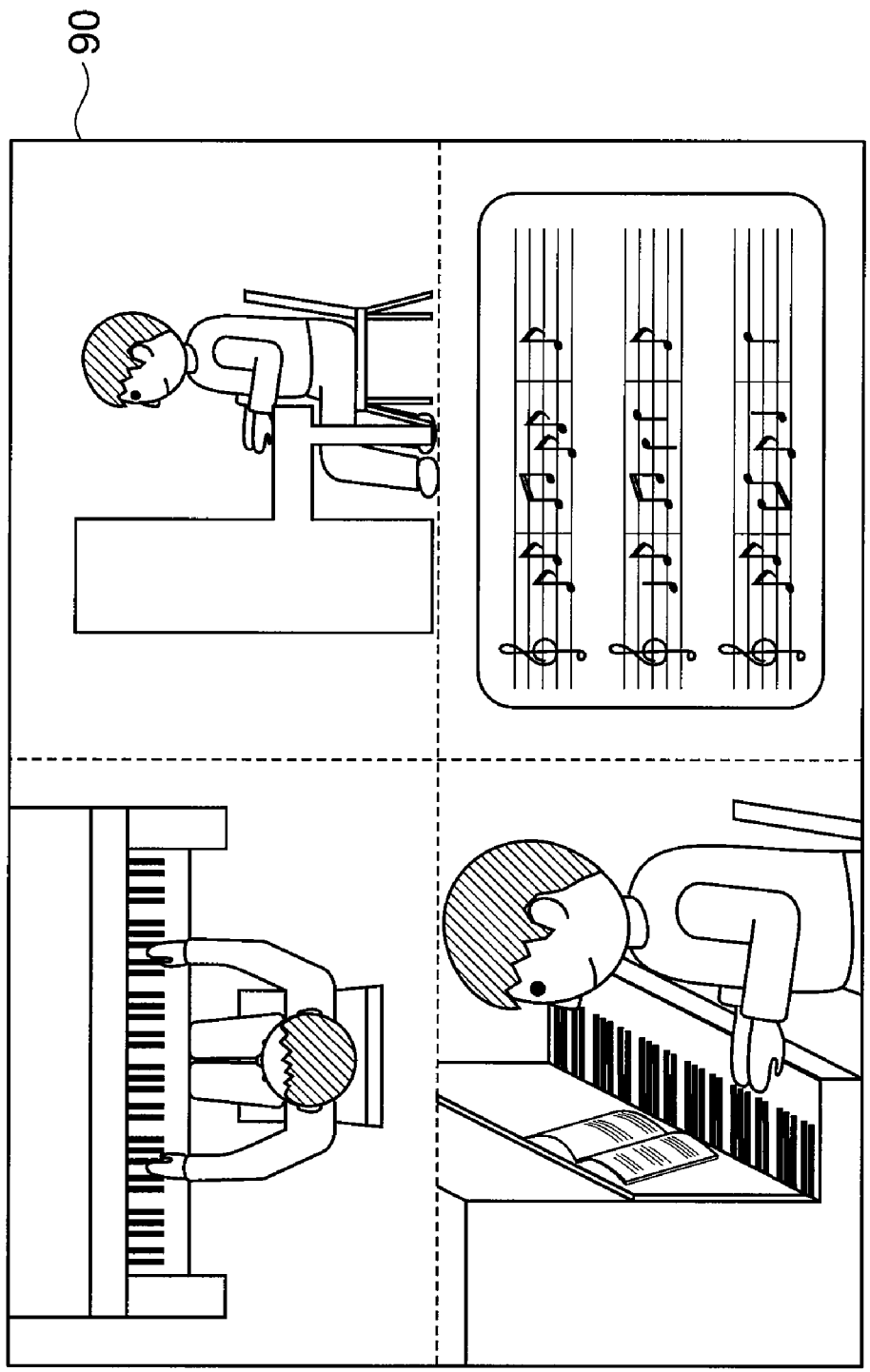
FIG. 23 is an illustration showing an example of an image frame for display in application of the frame coding according to the third application example shown in FIGS. 20 and 21.

Each of FIGS. 22 and 23 is an illustration showing an example of a display image frame in application of the frame coding according to the third application example shown in FIG. 20. The both display image frames are also obtained by the decoding as shown in FIG. 21, or by the decoding and combination with another image.

The display image frame 90 shown in FIG. 22 is a combination of a region 90a composed of images allocated to decoded sub-regions, with a personal image 90b of the interlocutor himself or herself In the example of the display image frame 90 shown in this FIG. 22, a still image such as a text image is allocated to hatched region 90c, and an ROI of the partner image to the rest region. In the third application example of the coding method for motion-image data according to the present invention, as described above, the ROI of the partner image may be allocated to any of the sub-regions $VT_{11}$-$VT_{33}$ of the virtual image frame in the coding process, and the ratio of the partner image and the still image such as the text image can be arbitrarily changed.

The display image frame 90 shown in FIG. 23 is one image frame constituting a motion image displayed on the instructor side, in a case where a piano lesson is assumed between an instructor and a piano player. As shown in this FIG. 23, multilateral images of the piano player are allocated to three sub-regions out of four sub-regions constituting a virtual image frame, and a text image displaying a musical note is allocated to the remaining region. As another example where multilateral images are allocated to sub-regions of a virtual image frame, images of respective attendants participating in a video conference between or among different points are allocated to some sub-regions constituting a virtual image frame, and text images displaying conference documents are allocated to the remaining sub-regions.

The present invention was accomplished particularly on the supposition of use in the special dialogue environments to transmit the motion-image data with information concentrated on only a partial region of the display image like the two-way interactive system realizing real-time two-way interaction. According to the present invention, a plurality of rectangular regions obtained by dividing an image frame are grouped into either of the ROI and the non-ROI, and coding of each image frame is performed using different compression levels for each rectangular region grouped in the ROI and for each rectangular region grouped in the non-ROI, thereby enabling the load reduction and speed increase of the coding process for motion-image data in the two-way interactive system.

It is apparent that the present invention can be modified in various ways in view of the above description of the present invention. It is noted that such modifications should not be construed as departing from the spirit and scope of the present invention, but all improvements obvious to those skilled in the art are to be embraced within the scope of the claims which follow.

What is claimed is:

1. A coding method for motion-image data in which each of image frames, arranged along a time axis so as to constitute motion-image data, is sequentially and individually compressed along a time axis, the coding method comprising the steps of:

setting a virtual image frame comprised of a plurality of sub-regions, as an image frame to be coded:

allocating one selected from at least one of a plurality of sub-images obtained by dividing an image frame to be coded out of the image frames constituting the motion-image data, and a clipped image obtained from another information source different from the motion-image data, to each of the plurality of sub-regions constituting the virtual image frame; and individually compressing each of the images allocated to the plurality of sub-regions constituting the virtual image frame, according to a coding level set for each of the plurality of sub-regions, thereby generating coded data of each virtual image frame including plural types of image information.

2. A coding method for motion-image data according to claim 1, wherein each of the plurality of sub-regions is grouped into either of a region of interest set in the virtual image frame and a region of no interest different from the region of interest, and wherein each of the plurality of sub-regions is compressed so that a code length of a sub-region grouped into the region of interest is larger than a code length of a sub-region grouped into the region of no interest.

3. A coding method for motion-image data according to claim 2, wherein a sub-region in which a motion of an image is detected, out of the plurality of sub-regions, is grouped into the region of interest.

4. A coding method for motion-image data according to claim 1, wherein coded data of an image allocated to at least one of the plurality of sub-regions constituting the virtual image frame is further encrypted.

5. A coding method for motion-image data according to claim 1, wherein in a process of coding at least one of the plurality of sub-regions, the code length of the sub-region is 0 during a certain period of time.

6. A coding method for motion-image data according to claim 1, wherein the virtual image frame is compressed each by JPEG2000.

7. A non-transitory recording medium storing a computer program for letting a computer execute a coding method for motion-image data according to claim 1.

8. A two-way interactive system for mutually presenting an image of an interlocutor photographed, to a partner interlocutor through predetermined transmission means to implement an interaction between the interlocutor and the partner interlocutor, wherein image frames constituting motion-image data transmitted and received through the transmission means are coded by a coding method for motion-image data in which each of image frames, arranged along a time axis so as to constitute motion-image data, is sequentially and individually compressed along a time axis, the coding method comprising the steps of:

setting a virtual image frame comprised of a plurality of sub-regions, as an image frame to be coded:

allocating one selected from at least one of a plurality of sub-images obtained by dividing an image frame to be coded out of the image frames constituting the motion-image data, and a clipped image obtained from another information source different from the motion-image data, to each of the plurality of sub-regions constituting the virtual image frame; and individually compressing each of the images allocated to the plurality of sub-regions constituting the virtual image frame, according to a coding level set for each of the plurality of sub-regions, thereby generating coded data of each virtual image frame including plural types of image information.

9. A terminal equipment applicable to a two-way interactive system for mutually presenting an image of an interlocutor photographed, to a partner interlocutor through predetermined transmission means to implement an interaction between the interlocutor and the partner interlocutor, comprising at least a display device for displaying an image of the partner interlocutor, and an image taking unit for taking the image of the interlocutor located in front of the display device, the terminal equipment comprising:

(1) a controller for implementing a coding method for motion-image data in which each of image frames, arranged along a time axis so as to constitute motion-image data, is sequentially and individually compressed along a time axis, the coding method comprising the steps of:

setting a virtual image frame comprised of a plurality of sub-regions, as an image frame to be coded:

allocating one selected from at least one of a plurality of sub-images obtained by dividing an image frame to be coded out of the image frames constituting the motion-image data, and a clipped image obtained from another information source different from the motion-image data, to each of the plurality of sub-regions constituting the virtual image frame; and individually compressing each of the images allocated to the plurality of sub-regions constituting the virtual image frame, according to a coding level set for each of the plurality of sub-regions, thereby generating coded data of each virtual image frame including plural types of image information; and (2) an input/output unit for sending coded data compressed by the controller, to the transmission means.

10. A terminal equipment of the two-way interactive system according to claim 9, further comprising input means for retrieving information about compression levels of the sub-regions and presence/absence of encryption thereof.

11. A terminal equipment of the two-way interactive system according to claim 9, wherein the controller (1) receives image data through the input/output unit, the image data being compressed such that, in a process of coding at least one of the plurality of sub-regions, the code length of the sub-region is 0 during a certain period of time and being transmitted to the transmission means, (2) decodes coded data of each of the sub-regions constituting the image data, and (3) combines the decoded sub-regions with an image prepared instead of the sub-region having the code length of 0, to generate display image data.

* * * * *

UNITED STATES PATENT AND TRADEMARK OFFICE
CERTIFICATE OF CORRECTION

PATENT NO. : 7,983,497 B2
APPLICATION NO. : 12/686993
DATED : July 19, 2011
INVENTOR(S) : Toshiaki Kakii et al.

It is certified that error appears in the above-identified patent and that said Letters Patent is hereby corrected as shown below:

On the title page item (73) Assignee, please add Hitoshi KIYA, Tokyo (JP)

Signed and Sealed this
Fifteenth Day of May, 2012

David J. Kappos
*Director of the United States Patent and Trademark Office*